United States Patent
Lee et al.

(10) Patent No.: US 12,206,074 B2
(45) Date of Patent: Jan. 21, 2025

(54) CATHODE HYBRID ELECTROLYTE FOR SOLID SECONDARY BATTERY, CATHODE INCLUDING THE CATHODE HYBRID ELECTROLYTE, METHOD OF PREPARING THE CATHODE, AND SOLID SECONDARY BATTERY INCLUDING THE CATHODE HYBRID ELECTROLYTE

(71) Applicant: Samsung Electronics Co., Ltd., Suwon-si (KR)

(72) Inventors: Myungjin Lee, Seoul (KR); Jusik Kim, Hwaseong-si (KR); Ryounghee Kim, Uiwang-si (KR); Victor Roev, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/398,595

(22) Filed: Dec. 28, 2023

(65) Prior Publication Data

US 2024/0136584 A1    Apr. 25, 2024

Related U.S. Application Data

(63) Continuation of application No. 16/852,513, filed on Apr. 19, 2020, now Pat. No. 11,901,510.

(30) Foreign Application Priority Data

Oct. 31, 2019    (KR) .......................... 10-2019-0138197

(51) Int. Cl.
*H01M 10/0568* (2010.01)
*C08F 112/14* (2006.01)
(Continued)

(52) U.S. Cl.
CPC ....... *H01M 10/0568* (2013.01); *C08F 112/30* (2020.02); *C08F 120/38* (2013.01);
(Continued)

(58) Field of Classification Search
CPC ......... H01M 10/0568; H01M 10/0562; H01M 4/362; H01M 4/62; H01M 2300/0025; H01M 2300/0068; H01M 2300/0088
See application file for complete search history.

(56) References Cited

U.S. PATENT DOCUMENTS

| 8,129,052 B2 | 3/2012 | Visco et al. |
| 2010/0304225 A1 | 12/2010 | Pascaly et al. |

(Continued)

FOREIGN PATENT DOCUMENTS

| CN | 108232138 A | 6/2018 |
| KR | 101953738 B1 | 3/2019 |
| WO | 2009013046 A2 | 1/2009 |

OTHER PUBLICATIONS

Kimura, Kento et al, Electrochemical properties of a poly(ethylene carbonate)-LiTFSI electrolyte containing a pyrrolidinium-based ionic liquid, Nov. 2014 (Year: 2014).

(Continued)

*Primary Examiner* — Jane J Rhee
(74) *Attorney, Agent, or Firm* — CANTOR COLBURN LLP

(57) ABSTRACT

Provided are a cathode hybrid electrolyte for a solid secondary battery, a cathode including the cathode hybrid electrolyte, a method of preparing the cathode, and a solid secondary battery including the cathode hybrid electrolyte, wherein the cathode hybrid electrolyte includes an ion conductor represented by Formula 1, and an ionic liquid, where at least a portion of the anions of the ionic liquid comprise the same anionic moiety —Y⁻ of the ion conductor, (Continued)

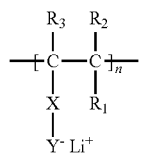

Formula 1 where, in Formula 1, X, $R_1$ to $R_3$, $Y^-$, and n are the same as defined in the detailed description.

20 Claims, 5 Drawing Sheets

(51) Int. Cl.
*C08F 120/38* (2006.01)
*H01M 4/36* (2006.01)
*H01M 4/62* (2006.01)
*H01M 10/0562* (2010.01)

(52) U.S. Cl.
CPC ............ *H01M 4/362* (2013.01); *H01M 4/62* (2013.01); *H01M 10/0562* (2013.01); *H01M 2300/0025* (2013.01); *H01M 2300/0068* (2013.01); *H01M 2300/0088* (2013.01)

(56) References Cited

U.S. PATENT DOCUMENTS

2015/0364773 A1 12/2015 Tamirisa et al.
2016/0190641 A1 6/2016 Lee et al.

OTHER PUBLICATIONS

Meziane, Rachid et al., Single-ion polymer electrolytes based on a delocalized polyanion for lihtium batteries, Dec. 2011 (Year: 2011).
Safa, Meer et al., Polymeric Ionic Liquid Gel Electrolyte for Room Temperature Lithium Batter Applications, Sep. 2016 (Year: 2016).
Single lithium-ion polymer electrolytes based on poly(ionic liquid)s for lithium-ion batteries, Soft Matter (2018, issue3).
Single-ion polymer electrolytes based on a delocalized polyanion for lithium batteries, Electrochimica Acta 57 2011 14-19.

CATHODE HYBRID ELECTROLYTE FOR SOLID SECONDARY BATTERY, CATHODE INCLUDING THE CATHODE HYBRID ELECTROLYTE, METHOD OF PREPARING THE CATHODE, AND SOLID SECONDARY BATTERY INCLUDING THE CATHODE HYBRID ELECTROLYTE

CROSS-REFERENCE TO RELATED APPLICATION

CROSS REFERENCE TO RELATED APPLICATION

This application is a continuation application of U.S. application Ser. No. 16/852,513, filed on Apr. 19, 2020, which claims priority to and the benefit of Korean Patent Application No. 10-2019-0138197, filed on Oct. 31, 2019, in the Korean Intellectual Property Office, and all the benefits accruing therefrom under 35 U.S.C. § 119, the content of which are incorporated herein in its their entireties by reference.

BACKGROUND

1. Field

The present disclosure relates to a cathode hybrid electrolyte for solid secondary batteries, a cathode including the cathode hybrid electrolyte, a method of preparing the cathode, and a solid secondary battery including the cathode hybrid electrolyte.

2. Description of Related Art

Recently, in accordance with industrial requirements, development of batteries with high energy density that are safer has become increasingly important. For example, lithium-ion batteries have been put to practical use in the automotive field as well as in information-related equipment and communication equipment. In the field of automobiles, safety is particularly important because it affects a person's life.

Currently available lithium ion batteries use an electrolytic solution including a flammable organic solvent, which results in the possibility of overheating and fire when a short circuit occurs. In contrast, a solid battery using a solid electrolyte instead of an electrolytic solution has been proposed.

In a solid battery, the possibility of a fire or an explosion, even when a short circuit occurs, may be greatly reduced by not using a flammable organic solvent. Therefore, a solid battery has a possibility of being safer compared to a lithium-ion battery using an electrolyte.

As a cathode active material of a solid battery, a cathode active material having stability at high voltage is used. However, when the cathode active material is excellent in high voltage stability, the wettability of the ionic liquid impregnated in the cathode is needed, in order to reduce the interfacial resistance between the cathode and the solid electrolyte of the solid secondary battery.

SUMMARY

Provided are cathode hybrid electrolytes for solid secondary batteries, the cathode hybrid electrolytes being solidified to prevent leakage to the outside and having improved wettability with respect to cathodes.

Provided are cathodes including the cathode hybrid electrolytes and methods of preparing the cathode hybrid electrolytes.

Provided are solid secondary batteries having improved cell performance by including cathodes including the cathode hybrid electrolytes.

Additional aspects will be set forth in part in the description which follows and, in part, will be apparent from the description, or may be learned by practice of the presented embodiments of the disclosure.

According to an aspect of an embodiment, a cathode hybrid electrolyte for a solid secondary battery includes an ion conductor represented by Formula 1 and an ionic liquid, wherein an anion of the ion conductor includes the same moiety of an anion of the ionic liquid.

Formula 1

In Formula 1,

X is an unsubstituted or substituted C6-C30 arylene group, an unsubstituted or substituted C2-C30 heteroarylene group, or —C(=O)O—R$_7$—, R$_7$ is an unsubstituted or substituted C1-O30 alkylene group or an unsubstituted or substituted C6-C30 arylene group, R$_1$ to R$_3$ are each independently hydrogen, an unsubstituted or substituted C1-O20 alkyl group, an unsubstituted or substituted C6-C20 aryl group, or an unsubstituted or substituted C2-C30 heteroaryl group, —Y$^-$ is an anionic moiety, and n is the degree of polymerization, which is a number in a range of 10 to 500.

According to an aspect of another embodiment, a cathode for a solid secondary battery includes a cathode active material; and the cathode hybrid electrolyte.

According to an aspect of another embodiment, a solid secondary battery includes a cathode; an anode; and a solid electrolyte disposed between the cathode and the anode, wherein at least one of the cathode or the anode includes the cathode hybrid electrolyte.

According to an aspect of another embodiment, a method of manufacture of a cathode for a solid secondary battery includes preparing a cathode by forming a cathode active material layer including a cathode active material on a cathode current collector; providing a hybrid electrolyte composition including a monomer represented by Formula 20 and an ionic liquid to the cathode; and applying light or heat to the provided hybrid electrolyte composition to cause a polymerization reaction, to obtain a cathode for a solid secondary battery including a cathode active material; and the cathode hybrid electrolyte.

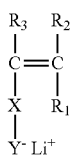

Formula 20

In Formula 20,
X is an unsubstituted or substituted C6-C30 arylene group, an unsubstituted or substituted C2-C30 heteroarylene group, or —C(=O)O—R$_7$—,
R$_7$ is an unsubstituted or substituted C1-030 alkylene group or an unsubstituted or substituted C6-C30 arylene group,
R$_1$ to R$_3$ are each independently hydrogen, an unsubstituted or substituted C1-C20 alkyl group, an unsubstituted or substituted C6-C20 aryl group, or an unsubstituted or substituted C2-C30 heteroaryl group, and
—Y$^-$ is an anionic moiety, wherein an anion of the ionic liquid comprises the same anionic moiety —Y— as in Formula 1.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
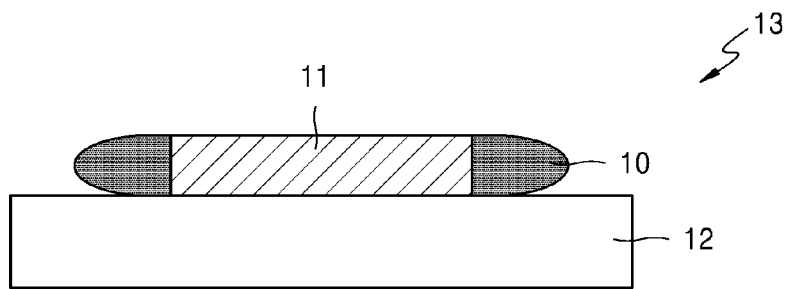
FIG. 1 is a schematic view of a structure in which a cathode including a hybrid electrolyte is disposed on a solid electrolyte, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, a cathode hybrid electrolyte for a solid secondary battery, according to an embodiment; a cathode including the cathode hybrid electrolyte; a method of preparing the cathode; and a solid secondary battery including the cathode hybrid electrolyte will be described in detail.

According to an aspect of an embodiment, provided is a cathode hybrid electrolyte for a solid secondary battery, the cathode hybrid electrolyte including an ion conductor represented by Formula 1 and an ionic liquid, wherein an anion of the ion conductor includes the same moiety with an anion of the ionic liquid.

Formula 1

In Formula 1,
X is an unsubstituted or substituted C6-C30 arylene group, an unsubstituted or substituted C2-C30 heteroarylene group, or —C(=O)O—R$_7$—,
R$_7$ is an unsubstituted or substituted C1-C30 alkylene group or an unsubstituted or substituted C6-C30 arylene group,
R$_1$ to R$_3$ are each independently hydrogen, an unsubstituted or substituted C1-C20 alkyl group, an unsubstituted or substituted C6-C20 aryl group, or an unsubstituted or substituted C2-C30 heteroaryl group,
—Y$^-$ is an anionic moiety, and
n is the degree of polymerization, which is a number in a range of 10 to 500, for example, a number in a range of 20 to 400, for example, a number in a range of 30 to 300, for example, a number in a range of 50 to 200.

The cathode hybrid electrolyte may further include a lithium salt different from the ion conductor of Formula 1.

In Formula 1, R$_1$ to R$_3$ may be, for example, hydrogen, a methyl group, an ethyl group, a propyl group, an isopropyl group, a pentyl group, or a butyl group. Also, R$_7$ may be, for example, a methylene group, an ethylene group, a propylene group, a pentylene group, or a hexylene group.

In the solid secondary battery, it is common to impregnate a cathode in a mixture including an ionic liquid to improve interface characteristics between the cathode and a solid electrolyte and a conductivity of the cathode. However, when a cathode active material including a cathode active material having excellent stability with respect to a high voltage such as a lithium cobalt oxide (LiCoO$_2$) is used in preparation of a cathode, the wettability of the cathode active material with respect to the cathode is insufficient due to a high viscosity of a mixture including an ionic liquid, and the mixture including the ionic liquid may leak to the outside as the charge-discharge cycles are repeated.

In this regard, to resolve this problem, the present inventors have invented a cathode hybrid electrolyte for a solid secondary battery, of which leakage to the outside is prevented and the wettability of the electrolyte with respect to a cathode improves by reducing a viscosity of the electrolyte.

The cathode hybrid electrolyte according to an embodiment includes an ion conductor represented by Formula 1 and an ionic liquid, wherein an anion of the ion conductor of Formula 1 has the same moiety of an anion of the ionic liquid. Thus, unlike a conventional mixture including an ionic liquid, the cathode hybrid electrolyte has a solidified form, and has a wettability with respect to a cathode that is improved due to a reduced viscosity, and has an improved miscibility as compared with a mixture including an ionic liquid. Therefore, when the hybrid electrolyte is used, not only leakage of the hybrid electrolyte to the outside may be suppressed despite repeated charge-discharge cycles, but also a lithium ion mobility in the cathode may effectively improve.

FIG. 1 shows a structure including a cathode impregnated with a cathode hybrid electrolyte and a solid electrolyte, according to an embodiment.

A cathode 13 has a cathode active material layer 11 and a cathode hybrid electrolyte 10 that are stacked on a solid electrolyte 12. As shown in FIG. 1, the cathode 13 is impregnated with the cathode hybrid electrolyte 10, which is particularly disposed in a solidified state around the cathode active material layer 11. In this regard, unlike a conventional mixture including an ionic liquid, a current collector may not be contaminated since the solidified cathode hybrid electrolyte 10 does not leak to the outside, and thus a side reaction between the cathode hybrid electrolyte 10 and the solid electrolyte 12 may be suppressed. Although not shown in FIG. 1, the cathode hybrid electrolyte 10 may exist in an interface between the cathode active material layer 11 and the solid electrolyte 12.

Also, when the cathode hybrid electrolyte is included in the cathode, an interface resistance between the cathode and the solid electrolyte may decrease, and a lithium ion mobility in the cathode may increase.

The cathode hybrid electrolyte 10 according to an embodiment may include an ion conductor represented by Formula 1, and thus a lithium ion mobility may improve. The ion conductor of Formula 1 can serve as a single lithium ion conductor due to its structural characteristics.

In Formula 1, —Y$^-$Li$^+$ may be, for example, a group represented by Formula 2 or Formula 3.

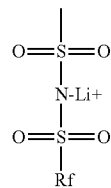

Formula 2

In Formula 2, Rf may be a fluorine atom, an unsubstituted or substituted C1-C30 fluorinated alkyl group, an unsubstituted or substituted C6-C30 arylene group, or a combination thereof.

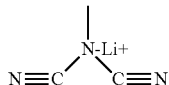

Formula 3

In Formula 2, Rf may be, for example, $CF_3$, F, or $CF_2CF_3$.

The ion conductor represented by Formula 1 may be, for example, a compound represented by Formula 4 or a compound represented by Formula 5.

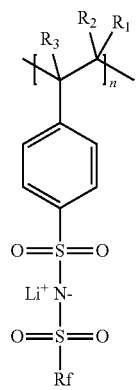

Formula 4

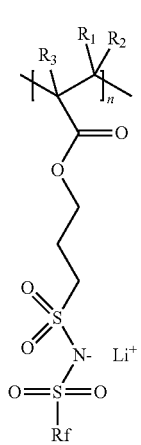

Formula 5

In Formula 4, n may be a number in a range of 10 to 500; $R_1$ to $R_3$ may be each independently hydrogen or a C1-C20 alkyl group; and Rf may be a fluorine atom, an unsubstituted or substituted C1-C30 fluorinated alkyl group, an unsubstituted or substituted C6-C30 arylene group, or a combination thereof.

In Formula 5, n may be a number in a range of 10 to 500; $R_1$ to $R_3$ may be each independently hydrogen or a C1-C20 alkyl group; and Rf may be a fluorine atom, an unsubstituted or substituted C1-C30 fluorinated alkyl group, an unsubstituted or substituted C6-C30 arylene group, or a combination thereof.

In Formulae 4 and 5, n may be, for example, a number in a range of 20 to 400, for example, a number in a range of 30 to 300, or, for example, a number in a range of 50 to 200.

The ion conductor represented by Formula 1 may be, for example, a compound represented by Formula 6, Formula 6-1, Formula 6-2, Formula 7, Formula 7-1, or Formula 7-2, or a combination thereof.

Formula 6

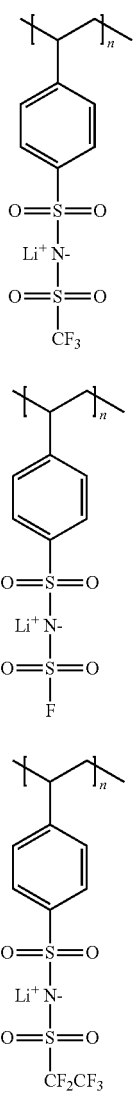

Formula 6-1

Formula 6-2

In Formulae 6, 6-1, and 6-2, n may be a number in a range of 10 to 500,

Formula 7

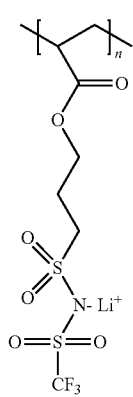

Formula 7-1

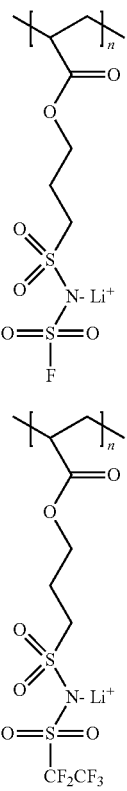

Formula 7-2

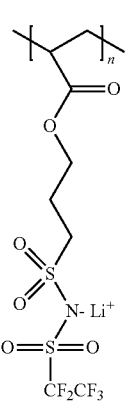

In Formulae 7, 7-1, and 7-2, n may be a number in a range of 10 to 500.

In Formulae 6, 6-1, 6-2, 7, 7-1, and 7-2, n may be, for example, a number in a range of 20 to 400, for example, a number in a range of 30 to 300, or, for example, a number in a range of 50 to 200.

The hybrid electrolyte may further include a lithium salt different from the ion conductor of Formula 1.

An amount of the ion conductor may be in a range of about 0.1 parts to about 50 parts by weight based on 100 parts by weight of the lithium salt. When the amount of the ion conductor is within this range, the resulting lithium ion mobility in the cathode may be excellent.

An amount of the ionic liquid in the cathode hybrid electrolyte may be in a range of about 1 part by weight to about 50 parts by weight, about 1 part by weight to about 40 parts by weight, about 5 parts by weight to about 30 parts by weight, about 10 parts by weight to about 30 parts by weight, or about 10 parts by weight to about 20 parts by weight, based on 100 parts by weight of the lithium salt. When the amount of the ionic liquid is within these ranges, the interfacial resistance between the cathode and the solid electrolyte may decrease, and the conductivity of the cathode may improve.

The ionic liquid may be a compound represented by Formula 8, a compound represented by Formula 9, or a combination thereof.

Formula 8

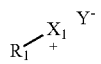

In Formula 8, $X_1$ may be $-N(R_2)(R_3)(R_4)$ or $-P(R_2)(R_3)(R_4)$, and $R_1$, $R_2$, $R_3$, and $R_4$ may be each independently an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C2-C30 heteroaryl group, an unsubstituted or substituted C2-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group.

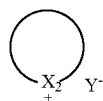

Formula 9

In Formula 9,

may be a heterocycloalkyl ring or a heteroaryl ring including 1 to 3 heteroatoms and 2 to 30 carbon atoms, wherein the ring is substituted with a substituent or unsubstituted; $X_2$ is $-N(R_5)(R_6)$, $-N(R_6)$, $-P(R_5)$, or $-P(R_5)(R_6)$; and the substituent in the ring, $R_5$, and $R_6$ are each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C2-C30 heteroaryl group, an unsubstituted or substituted C2-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group; and $Y^-$ may be an anion.

In some embodiments at least a portion of the anions $Y^-$ of the ionic liquid represented by Formula 8 may include the anionic moiety $-Y^-$ as described in Formula 1. In some embodiments, all or substantially all of the anions $Y^-$ of the ionic liquid represented by Formula 8 may include the anionic moiety $-Y^-$ as described in Formula 1.

The ionic liquid may be, for example, a compound represented by Formula 10, a compound represented by Formula 11, or a combination thereof.

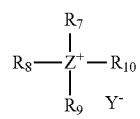

Formula 10

Formula 11

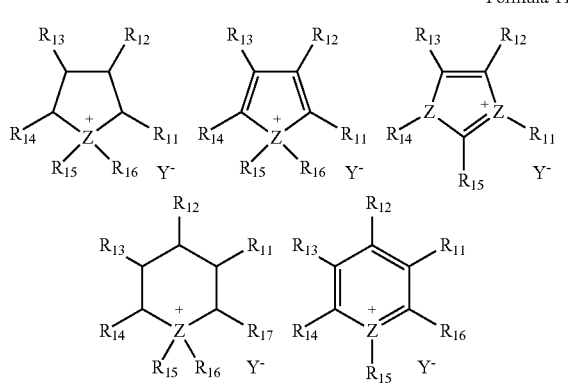

In Formula 10, Z may be N or P; and $R_7$, $R_8$, $R_9$, and $R_{10}$ may be each independently an unsubstituted or substituted C1-C30 alkyl group, an unsubstituted or substituted C6-C30 aryl group, an unsubstituted or substituted C2-C30 heteroaryl group, an unsubstituted or substituted C4-C30 cycloalkyl group, or an unsubstituted or substituted C3-C30 heterocycloalkyl group.

In Formula 11, Z may be N or and $R_{11}$, $R_{12}$, $R_{13}$, $R_{14}$, $R_{15}$, $R_{16}$, and $R_{17}$ may be each independently hydrogen, an unsubstituted or substituted C1-C30 alkyl group, an unsubstituted or substituted C6-C30 aryl group, an unsubstituted or substituted C2-C30 heteroaryl group, an unsubstituted or substituted C4-C30 cycloalkyl group, or an unsubstituted or substituted C3-C30 heterocycloalkyl group.

In Formula 10,

Z may be N or $R_7$, $R_8$, $R_9$, and $R_{10}$ may be each independently an unsubstituted or substituted C1-C30 alkyl group, an unsubstituted or substituted C6-C30 aryl group, an unsubstituted or substituted C2-C30 heteroaryl group, an unsubstituted or substituted C4-C30 cycloalkyl group, or an unsubstituted or substituted C3-C30 heterocycloalkyl group; and $Y^-$ may be an anion or, for example, an anion represented by Formula 2-1 or Formula 3-1.

Formula 2-1

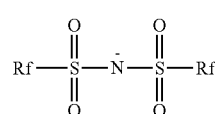

In Formula 2-1, Rf may be a fluorine atom, an unsubstituted or substituted C1-C30 fluorinated alkyl group, an unsubstituted or substituted C6-C30 arylene group, or a combination thereof.

Formula 3-1

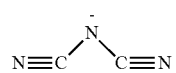

The ionic liquid may be, for example, a compound represented by one of Formulae 11a, 11b, and 12 to 15, or a combination thereof.

Formula 11a

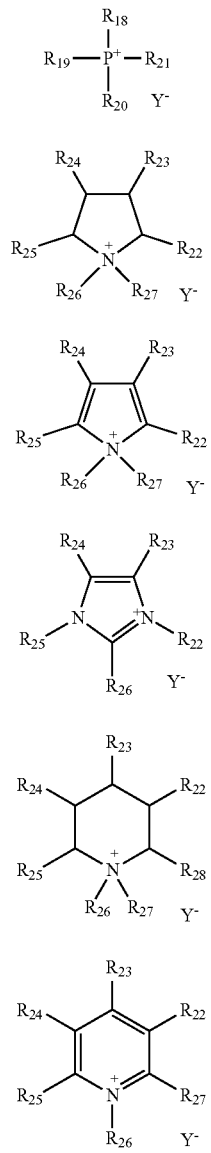

Formula 11b

Formula 12

Formula 13

Formula 14

Formula 15

In Formulae 11a, 11b, and 12 to 15, $R_{18}$ to $R_{27}$ may be each independently an unsubstituted or substituted C1-C30 alkyl group, an unsubstituted or substituted C6-C30 aryl group, an unsubstituted or substituted C2-C30 heteroaryl group, an unsubstituted or substituted C4-C30 cycloalkyl group, or an unsubstituted or substituted C3-C30 heterocycloalkyl group.

In Formulae 11a, 11b, and 12 to 15, $Y^-$ may be $(C_2F_5SO_2)_2N^-$, $(C_2F_5SO_2)(CF_3SO_2)N^-$, $(CF_3SO_2)_2N^-$, $(CN)_2N^-$, or a combination thereof, or, for example, an anion represented by Formula 2-1 or Formula 3-1.

Formula 2-1

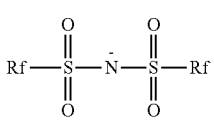

Formula 3-1

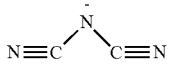

In Formula 2-1, Rf may be a fluorine atom, an unsubstituted or substituted C1-C30 fluorinated alkyl group, an unsubstituted or substituted C6-C30 arylene group, or a combination thereof.

The ionic liquid may be at least one of a compound represented by Formulae 30 to 33.

Formula 30

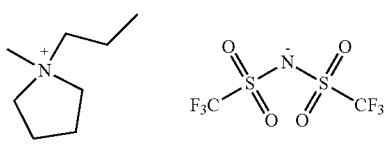

Formula 31

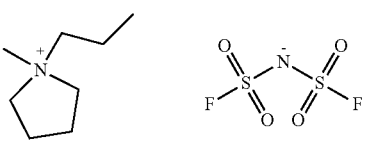

Formula 32

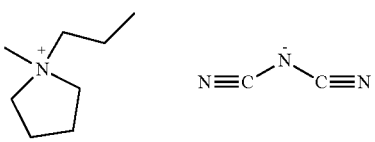

Formula 33

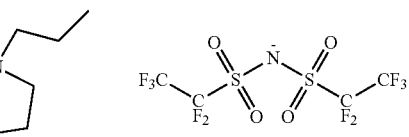

When the compound of Formulae 31 to 34 is used as the ionic liquid, using the ion conductor of Formula 4 as an ion conductor may further increase a miscibility of the cathode hybrid electrolyte.

Examples of the lithium salt of the cathode hybrid electrolyte may include $LiPF_6$, $LiBF_4$, $LiCF_3SO_3$, $Li(CF_3SO_2)_2N$, $Li(CF_3SO_2)_3C$, $LiC_2F_5SO_3$, $Li(FSO_2)_2N$, $LiC_4F_9SO_3$, $LiN(SO_2CF_2CF_3)_2$, $LiN(CN)_2$, and a compound represented by Formulae 16 to 19, and a concentration of the lithium salt may be in a range of about 0.01 M to about 5 M, or, for example, about 0.1 M to about 3 M or about 0.1 M to about 2 M.

Formula 16

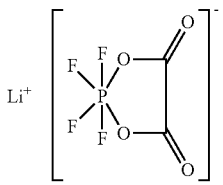

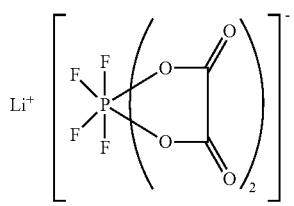
Formula 17

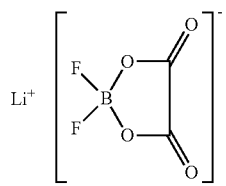
Formula 18

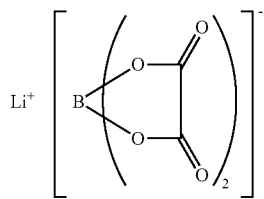
Formula 19

A viscosity of the cathode hybrid electrolyte according to an embodiment may be in a range of about 25 centipoise (cps) to about 450 cps, or, about 100 cps to about 450 cps, or about 300 cps to about 450 cps. When the viscosity of the cathode hybrid electrolyte is within these ranges, wettability with respect to the cathode may be excellent, and leakage to the outside may be prevented.

A weight average molecular weight of the ion conductor of Formula 1 may be about 50,000 Dalton or greater or, for example, in a range of about 50,000 Dalton to about 300,000 Dalton. When the weight average molecular weight of the ion conductor is within this range, an ion conductivity of the cathode hybrid electrolyte may further improve. The weight average molecular weight of the ion conductor may be measured by using a gel permeation chromatography (GPC).

The ion conductivity of the cathode hybrid electrolyte according to an embodiment at 25° C. is about 0.5 Siemens per centimeter (S/cm) or higher or, in a range of about 0.5 S/cm to about 1 S/cm, or about 0.6 S/cm to about 0.8 S/cm. When the cathode including the cathode hybrid electrolyte is used, an increase of the internal resistance of the solid secondary battery is suppressed.

A lithium ion mobility of the cathode hybrid electrolyte according to an embodiment may be about 0.5 or higher or, in a range of about 0.5 to about 0.7, or about 0.5 to about 0.65.

According to another aspect of an embodiment, provided is a cathode for a solid secondary battery, the cathode including a cathode active material and the cathode hybrid electrolyte according to an embodiment.

The cathode includes a plurality of cathode active material particles, and a cathode hybrid electrolyte may be included between the plurality of cathode active material particles.

The cathode may include a cathode active material layer including the cathode active material, and the cathode hybrid electrolyte may be disposed in at least one of pores in the cathode active material layer or may be disposed on a surface of the cathode active material layer. In this regard, an interfacial resistance between the cathode active material particles decreases, and thus an internal resistance of the solid secondary battery including the cathode decreases. Also, a mixture density of the cathode may improve. The cathode may be prepared through a process of stacking the cathode active material layer on the cathode current collector and impregnating the resultant in the cathode hybrid electrolyte.

A mixture density of the cathode active material layer including the cathode active material and the cathode hybrid electrolyte may be, about 3.0 grams per cubic centimeter (g/cm 3) or higher, about 3.1 g/cm$^3$ or higher, about 3.2 g/cm$^3$ or higher, or in a range of about 3.2 g/cm$^3$ to about 3.5 g/cm$^3$. An energy density of the solid secondary battery including the cathode may improve.

According to another aspect of an embodiment, provided is a solid secondary battery including a cathode; an anode; and a solid electrolyte disposed between the cathode and the anode, wherein at least one of the cathode and the anode includes the cathode hybrid electrolyte.

The solid electrolyte may be, for example, at least one selected from a sulfide-based solid electrolyte and an oxide-based, i.e., an oxide-containing solid electrolyte, but embodiments are not limited thereto, and any material available as an inorganic solid electrolyte in the art may be used.

The solid electrolyte may be, for example, an oxide-based solid electrolyte. The oxide-based solid electrolyte may be, for example, at least one selected from $Li_{1+x+y}Al_xTi_{2-x}Si_yP_{3-y}O_{12}$ (where 0<x<2 and 0≤y<3), $BaTiO_3$, $Pb(Zr,Ti)O_3$ (PZT), $Pb_{1-x}La_xZr_{1-y}Ti_yO_3$ (PLZT) (where 0≤x<1 and 0≤y<1), $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$) (where 0<x<2 and 0<y<3), lithium aluminum titanium phosphate ($Li_xAl_yTi_z(PO_4)_3$) (where 0<x<2, 0<y<1, and 0<z<3), $Li_{1+x+y}(Al_aGa_{1-a})_x(Ti_bGe_{1-b})_{2-x}Si_yP_{3-y}O_{12}$ (where 0≤x≤1 0≤y≤1, 0≤a≤1, and 0≤b≤1) lithium lanthanum titanate ($Li_xLa_yTiO_3$) (where 0<x<2 and 0<y<3), lithium germanium thiophosphate ($Li_xGe_yP_zS_w$) (where 0<x<4, 0<y<1, 0<z<1, and 0<w<5), lithium nitride-based glass ($Li_xN_y$) (where 0<x<4 and 0<y<2), $SiS_2$ ($Li_xSi_yS_z$) (where 0<x<3, 0<y<2, and 0<z<4), $P_2S_5$-based glass ($Li_xP_yS_z$) (where 0<x<3, 0<y<3, and 0<z<7), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-type ceramics, and garnet-type ceramics $Li_{3+x}La_3M_2O_{12}$ (M=Te, Nb, or Zr) (where x is an integer of 1 to 10), or a combination thereof. The cathode hybrid electrolyte according to an embodiment may have a reduced reactivity to an oxide-based solid electrolyte and thus may suppress a side reaction therebetween.

The inorganic solid electrolyte may be, for example, a sulfide-based solid electrolyte. The sulfide-based solid electrolyte may be, for example, at least one selected from $Li_2S$—$P_2S_5$ or $Li_2S$—$P_2S_5$—LiX (where X is a halogen atom), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each a positive integer; and Z is one of Ge, Zn, and Ga), $Li_2S$-$GeS_2$, $Li_2S$—$SiS_2$—$Li_3PO_4$, $Li_2S$—$SiS_2$—$Li_pMO_q$ (where p and q are each a positive integer; and M is one of P, Si, Ge, B, Al, Ga, and In), $Li_{7-x}PS_{6-x}Cl_x$ (where 0≤x≤2), $Li_{7-x}PS_{6-x}Br_x$ (where 0≤x≤2), and $Li_{7-x}PS_{6-x}I_x$ (where $0 \le x \le 2$). When the organic salt is used, a reactivity of the sulfide-based solid electrolyte and the organic salt may significantly decrease.

An oxidation current density of the cathode hybrid electrolyte according to an embodiment measured by using Linear Sweep Voltammetry (LSV) at 25° C. is $1 \times 10^{-5}$ A/cm² or lower versus a lithium metal until 4.3 V. For example, a voltage of the hybrid electrolyte having an oxidation current density measured by LSV at 25° C. of $1 \times 10^{-5}$ A/cm² or lower versus a lithium metal is about 3.2 V or higher, about 3.5 V or higher, about 4.0 V or higher, about 4.1 V or higher, about 4.2 V or higher, about 4.3 V or higher, about 4.5 V or higher, or about 5.0 V or higher. A voltage of the hybrid electrolyte may be, for example, in a range of about 3.2 V to about 5 V.

When the cathode hybrid electrolyte includes an electrochemically stable voltage window of a wide range, cycle characteristics of the solid secondary battery including the hybrid electrolyte may, for example, improve within a high voltage range.

The cathode active material may include, for example, a lithium transition metal oxide having a layered rock-salt structure. In some embodiments, the electrode may be, for example, an anode including an anode active material. The anode active material may include, for example, amorphous carbon, crystalline carbon, metal, or metalloid that may form an alloy or a compound with lithium.

Figure 5:
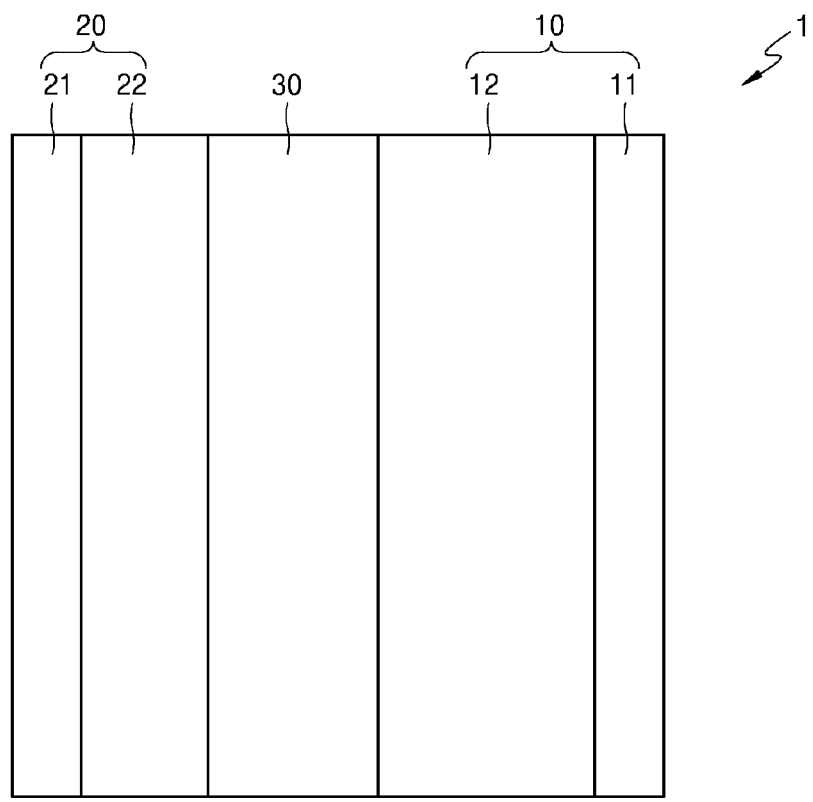
FIG. 5 is a cross-sectional view of a solid secondary battery according to an exemplary embodiment.

FIG. 5 shows a structure of the solid secondary battery according to an embodiment.

Referring to FIG. 5, a solid secondary battery 1 includes an anode 20 including an anode active material layer 22; a cathode 10 including a cathode active material layer 12; and a solid electrolyte 30 disposed between the anode 20 and the cathode 10.

Cathode

The cathode 10 includes a cathode current collector 11 and the cathode active material layer 12. The cathode 10 may include the cathode hybrid electrolyte described above. Although not shown in FIG. 5, the cathode hybrid electrolyte may exist at an interface between the cathode 10 and the solid electrolyte 30 or may exist around the cathode 10 in a solidified state.

The cathode active material layer 12 may include, for example, a cathode active material and a cathode hybrid electrolyte. The cathode active material is a cathode active material capable of reversibly absorbing and desorbing lithium ions. The cathode active material may be, for example, a lithium transition metal oxide such as a lithium cobalt oxide (LCO), a lithium nickel oxide, a lithium nickel cobalt oxide, a lithium nickel cobalt aluminum oxide (NCA), a lithium nickel cobalt manganate (NCM), a lithium manganate, or a lithium iron phosphate; a nickel sulfide; a copper sulfide; a lithium sulfide; an iron oxide; or a vanadium oxide, but embodiments are not limited thereto, and any material available as a cathode active material in the art may be used. Examples of the cathode active material may be used alone or in a mixture of at least two selected therefrom. The cathode active material may be, for example, a lithium cobalt oxide (LCO) which has excellent high-voltage stability.

The lithium transition metal oxide may be, for example, a compound represented by one of the following formulae: $Li_aA_{1-b-c}Co_bB'_cD_\alpha$ (where $0.90 \le a \le 1$ and $0 \le b \le 0.5$); $Li_aE_{1-b}B'_bO_{2-c}D_c$ (where $0.90 \le a \le 1$, $0 \le b \le 0.5$, $0 \le c \le 0.05$); $LiE_{2-b}B'_bO_{4-c}D_c$ (where $0 \le b \le 0.5$ and $0 \le c \le 0.05$); $Li_aNi_{1-b-c}Co_bB'_cD_\alpha$ (where $0.90 \le a \le 1$, $0 \le b \le 0.5$, $0 \le c \le 0.05$, and $0 < \alpha \le 2$); $Li_aNi_{1-b-c}Co_bB'_cO_{2-\alpha}F'_\alpha$ (where $0.90 \le a \le 1$, $0 \le b \le 0.5$, $0 \le c \le 0.05$, and $0 < \alpha < 2$); $Li_aN_{1-b-c}Co_bB'_cO_{2-\alpha}F'_2$ (where $0.90 \le a \le 1$, $0 \le b \le 0.5$, $0 \le c \le 0.05$, and $0 < \alpha < 2$); $Li_aNi_{1-b-c}Mn_bB'_cD_\alpha$ (where $0.90 \le a \le 1$, $0 \le b \le 0.5$, $0 \le c \le 0.05$, and $0 < \alpha \le 2$); $Li_aNi_{1-b-c}Mn_bB'_cO_{2-\alpha}F'_\alpha$ (where $0.90 \le a \le 1$, $0 \le b \le 0.5$, $0 \le c \le 0.05$, and $0 < \alpha < 2$); $Li_aNi_{1-b-c}Mn_bB'_cO_{2-\alpha}F'_2$ (where $0.90 \le a \le 1$, $0 \le b \le 0.5$, $0 \le c \le 0.05$, and $0 < \alpha < 2$); $Li_aNi_bE_cG_dO_2$ (where $0.90 \le a \le 1$, $0 \le b \le 0.9$, $0 \le c \le 0.5$, and $0.001 \le d \le 0.1$); $Li_aNi_bCo_cMn_dGeO_2$ (where $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1$ and $0.001 \le b \le 0.1$); $Li_aCoG_bO_2$ (where $0.90 \le a \le 1$ and $0.001 \le b \le 0.1$); $Li_aMnG_bO_2$ (where $0.90 \le a \le 1$ and $0.001 \le b \le 0.1$); $Li_aMn_2G_bO_4$ (where $0.90 \le a \le 1$ and $0.001 \le b \le 0.1$); $QO_x$; $QS_2$; $LiQS_2$; $V_2O_5$; $LiV_2O_5$; $LiI'O_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$. In the compound, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof. The compounds may have a surface coating layer (hereinafter, also referred to as "coating layer").

Alternatively, a mixture of a compound without a coating layer and a compound having a coating layer, the compounds being selected from the compounds listed above, may be used. In some embodiments, the coating layer may include at least one compound of a coating element of oxide, hydroxide, oxyhydroxide, oxycarbonate, or hydroxycarbonate of the coating element.

In some embodiments, the compounds for the coating layer may be amorphous or crystalline. In some embodiments, the coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the coating layer may be formed using any method that does not significantly adversely affect the physical properties of the cathode active material when a compound of the coating element is used. For example, the coating layer may be formed using a spray coating method or a dipping method. The coating methods may be well understood by one of ordinary skill in the art, and thus a detailed description thereof will be omitted.

The cathode active material may include, for example, a lithium salt of a transition metal oxide that has a layered rock-salt type structure among the examples of the lithium transition metal oxide. For example, the "layered rock-salt type structure" refers to a structure in which an oxygen atom layer and a metal atom layer are alternately and regularly arranged in a 111 direction in a cubic rock-salt type structure, where each of the atom layers forms a two-dimensional flat plane. The "cubic rock-salt type structure" refers to a sodium chloride (NaCl) type structure, which is one of the crystalline structures, in particular, to a structure in which face-centered cubic (fcc) lattices respectively formed of anions and cations are shifted by only a half of the ridge of each unit lattice. Examples of the lithium transition metal oxide having the layered rock-salt type structure may include a ternary lithium transition metal oxide expressed as $LiNi_xCo_yAl_zO_2$ (NCA) or $LiNi_xCo_yMn_zO_2$ (NCM) (where $0<x<1$, $0<y<1$, $0<z<1$, and $x+y+z=1$). When the cathode active material includes a ternary transition metal oxide having the layered rock-salt type structure, an energy density and thermal stability of the solid secondary battery 1 may improve.

The cathode active material may be, for example, a lithium cobalt oxide (LCO) having excellent high-voltage stability.

The cathode active material may be covered by a coating layer as described above. The coating layer is any material that may be used as a coating layer of a cathode active material of a solid secondary battery in the art. The coating layer may be, for example, $Li_2O$—$ZrO_2$.

When the cathode active material includes nickel (Ni) as a ternary lithium transition metal oxide such as NCA or NCM, a capacity density of the solid secondary battery 1 increases, and thus metal elution from the cathode active material in a charged state may be reduced. As a result, the solid secondary battery 1 according to an embodiment may have improved cycle characteristics in a charged state.

A shape of the cathode active material may be, for example, particulate shapes such as a true spherical shape, an elliptical shape, or a spherical shape. A particle diameter of the cathode active material is not particularly limited but may be in a range applicable to a cathode active material of a conventional solid secondary battery. An amount of the cathode active material of the cathode 10 is not particularly limited and may be in a range applicable to a cathode layer of a conventional solid secondary battery.

The cathode current collector 11 may be, for example, a plate or a foil that is formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

Additives such as a conducting agent, a binder, a filler, a dispersant, and an ion conducting agent may be added to the cathode 10 in addition to the cathode active material and the solid electrolyte. Examples of the conducting agent are acetylene black, ketjen black, natural graphite, artificial graphite, carbon black, carbon fiber; metal powder or metal fiber of copper, nickel, aluminum, or silver; and a conductive material, such as a polyphenylene derivative, which may be used alone or as a mixture thereof. Examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. The coating agent, the dispersant, and the ion conducting agent that may be appropriately added to the cathode 10 may be commonly known materials that are generally used in an electrode of a solid secondary battery in the art.

A thickness of the cathode may be in a range of about 0.1 µm to about 100 µm. A thickness of the solid electrolyte may be in a range of about 1 nm to about 1000 µm, for example, about 0.1 µm to about 100 µm, for example, about 0.5 µm to about 70 µm, for example, about 1 µm to about 50 µm, or, for example, about 1 µm to about 20 µm.

Anode

The anode 20 includes an anode current collector layer 21 and an anode active material layer 22. An anode active material in the anode active material layer 22 may be, for example, in the form of particles. An average particle diameter of the anode active material in the form of particles may be, for example, about 4 µm or less, about 3 µm or less, about 2 µm or less, about 1 µm or less, or about 900 nm or less. An average particle diameter of the anode active material in the form of particles may be, for example, in a range of about 10 nm to about 4 µm, about 10 nm to about 3 µm, about 10 nm to about 2 µm, about 10 nm to about 1 µm, or about 10 nm to about 900 nm. Due to the anode active material having an average particle diameter within these ranges, reversible absorbing and/or desorbing of lithium during charging/discharging may further be facilitated. The average particle diameter of the anode active material may be a median diameter (D50) measured by using a laser-diffraction particle size distribution meter.

The anode active material in the anode active material layer 22 may be, for example, a carbonaceous anode active material and/or a noncarbonaceous anode active material.

Examples of the carbonaceous anode active material may include crystalline carbon, amorphous carbon, and mixtures thereof. Examples of the crystalline carbon are graphite, such as natural graphite or artificial graphite that are non-shaped or in plate, flake, spherical, or fibrous form, and examples of the amorphous carbon are soft carbon (carbon sintered at low temperatures), hard carbon, meso-phase pitch carbides, and sintered cokes. Examples of the amorphous carbon may include carbon black (CB), acetylene black (AB), furnace black (FB), ketjen black (KB), and graphene, but embodiments are not limited thereto, and any material available as amorphous carbon in the art may be used.

A metal or a metalloid anode active material may include at least one of gold (Au), platinum (Pt), palladium (Pd), silicon (Si), silver (Ag), aluminum (Al), bismuth (Bi), tin (Sn), or zinc (Zn), but embodiments are not limited thereto, and any material available as a metal anode active material or a metalloid anode active material that forms an alloy or a compound with lithium in the art may be used. For example, nickel (Ni) does not form an alloy with lithium and thus is not a metal anode active material.

The anode active material in the anode active material layer 22 may be a non-carbonaceous anode active material. For example, the non-carbonaceous anode active material is at least one of a metal alloyable with lithium, an alloy of a metal alloyable with lithium, or an oxide of a metal alloyable with lithium. Examples of the metal alloyable with lithium may be Si, Sn, Al, Ge, Pb, Bi, Sb, a Si—Y alloy (where Y is an alkali metal, an alkali earth metal, Group XIII to XIV elements, a transition metal, a rare earth element, or a combination thereof, and Y is not Si), and a Sn—Y alloy (where Y is an alkali metal, an alkali earth metal, Group XIII to XIV elements, a transition metal, a rare earth element, or a combination thereof, and Y is not Sn). In some embodiments, Y may be magnesium (Mg), calcium (Ca), strontium (Sr), barium (Ba), radium (Ra), scandium (Sc), yttrium (Y), titanium (Ti), zirconium (Zr), Hf, Rf, V, Nb, Ta, Db, chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or a combination thereof. Examples of the transition metal oxide may include a lithium titanium oxide, a vanadium oxide, and a lithium vanadium oxide. Examples of the non-transition metal oxide may include $SnO_2$ and $SiO_x$ (where $0<x<2$). Examples of the non-carbonaceous anode active material may include at least one of Si, Sn, Pb, Ge, Al, $SiO_x$ (where $0<x<2$), $SnO_y$ (where $0<y\leq2$), $Li_4Ti_5O_{12}$, $TiO_2$, $LiTiO_3$, or $Li_2Ti_3O_7$, but embodiments are not limited thereto, and any material available as an uncarbonaceous anode active material in the art may be used.

The anode current collector 21 may be, for example, formed of a material that does not react with lithium, that is, a material that neither forms an alloy nor a compound. Examples of the material forming the anode current collector 21 may include copper (Cu), stainless steel, titanium (Ti), iron (Fe), cobalt (Co), and nickel (Ni), but embodiments are not limited thereto, and any material available as an electrode current collector in the art may be used. The anode current collector 21 may be formed of one of those examples of the metal or may be formed of an alloy or a coating material of at least two metals. The anode current collector 21 may be, for example, in the form of plate or foil.

The anode active material layer 22 may further include additives used in the conventional solid secondary battery 1, such as a filler, a dispersant, a conducting agent, and a binder. The anode active material layer 22 may be, for example, formed using a filler, a dispersant, a conducting agent, and a binder used in the cathode active material layer 12.

Solid Electrolyte

The electrolyte 30 includes the solid electrolyte 30 disposed between the cathode 10 and the anode 20 as shown in FIG. 5. The solid electrolyte 30 may or may not include a hybrid electrolyte.

The solid electrolyte is, for example, a sulfide-based solid electrolyte. Examples of the sulfide-based solid electrolyte may include at least one selected from $Li_2S$—$P_2S_5$, $Li_2S$—$P_2S_5$—LiX (where X is a halogen), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are each a positive integer, and Z is one of Ge, Zn, and Ga), $Li_2S$—$GeS_2$, $Li_2S$—$SiS_2$—$Li_3PO_4$, and $Li_2S$—$SiS_2$—$Li_pMO_q$ (where p and q are each a positive integer, and M is one of P, Si, Ge, B, Al, Ga, and In). For example, the sulfide-based solid electrolyte material may be prepared by melting and quenching starting materials (e.g., $Li_2S$ or $P_2S_5$), or mechanical milling the starting materials. Subsequently, the sulfide-based electrode may be heat-treated. The sulfide-based solid electrolyte may be amorphous or crystalline and may be a mixed form thereof.

Also, the solid electrolyte 30 may include sulfur (S), phosphorus (P), and lithium (Li), as component elements in the sulfide-based solid electrolyte material. For example, the solid electrolyte 30 may be a material including $Li_2S$—$P_2S_5$. When $Li_2S$—$P_2S_5$ is used as a sulfide-based solid electrolyte material that forms the solid electrolyte 30, a mixed molar ratio of $Li_2S$ and $P_2S_5$ ($Li_2S$:$P_2S_5$) may be, for example, in a range of about 50:50 to about 90:10. Particularly, the sulfide-based solid electrolyte in the solid electrolyte 30 may be an argyrodite-type compound including at least one selected from $Li_{7-x}PS_{6-x}Cl_x$ (where $0\leq x\leq2$), $Li_{7-x}PS_{6-x}Br_x$ (where $0\leq x\leq2$), and $Li_{7-x}PS_{6-x}I_x$ (where $0\leq x\leq2$). Examples of the argyrodite-type sulfide-based solid electrolyte may include $Li_6PS_5Cl$, $Li_6PS_5Br$, or $Li_6PS_5I$.

Alternatively, the solid electrolyte 30 may be, for example, an oxide-based solid electrolyte. The oxide-based solid electrolyte may be, for example, at least one selected from $Li_{1+x+y}Al_xTi_{2-x}Si_yP_{3-y}O_{12}$ (where $0<x<2$ and $0\leq y<3$), $BaTiO_3$, $Pb(Zr,Ti)O_3$ (PZT), $Pb_{1-x}La_xZr_{1-y}Ti_yO_3$ (PLZT) (where $0\leq x<1$ and $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate ($Li_3PO_4$), lithium titanium phosphate ($Li_xTi_y(PO_4)_3$) (where $0<x<2$ and $0<y<3$), lithium aluminum titanium phosphate ($Li_xAl_yTi_z(PO_4)_3$) (where $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (where $0\leq x\leq1$ $0\leq y\leq1$, $0\leq a\leq1$, and $0\leq b\leq1$), lithium lanthanum titanate ($Li_xLa_yTiO_3$) (where $0<x<2$ and $0<y<3$), lithium germanium thiophosphate ($Li_xGe_yP_zS_w$) (where $0<x<4$, $0<y<1$, $0<z<1$, and $0<w<5$), lithium nitride-based glass ($Li_xN_y$) (where $0<x<4$ and $0<y<2$), $SiS_2$ ($Li_xSi_yS_z$) (where $0<x<3$, $0<y<2$, and $0<z<4$), $P_2S_5$-based glass ($Li_xP_yS_z$) (where $0<x<3$, $0<y<3$, and $0<z<7$), $Li_2O$, LiF, LiOH, $Li_2CO_3$, $LiAlO_2$, $Li_2O$—$Al_2O_3$—$SiO_2$—$P_2O_5$—$TiO_2$—$GeO_2$-type ceramics, and garnet-type ceramics $Li_{3+x}La_3M_2O_{12}$ (M=Te, Nb, or Zr) (where x is an integer of 1 to 10), or a combination thereof. The oxide-based solid electrolyte may be amorphous or crystalline and may be a mixed form thereof.

For example, the solid electrolyte 30 may further include a binder. Examples of the binder included in the solid electrolyte layer 30 may be styrene butadiene rubber (SBR), polytetrafluoroethylene, polyvinylidene fluoride, or polyethylene, but embodiments are not limited thereto, and any material available as a binder in the art may be used. The binder of the solid electrolyte 30 may be the same with or different from a binder of the cathode active material layer 12 and the anode active material layer 22.

For example, the cathode 10, the anode 20, and the solid electrolyte 30 are each prepared separately and then stacked to prepare the solid secondary battery 1.

Preparation of Cathode

Materials constituting the cathode active material layer 12, such as a cathode active material, a conducting agent, and a binder, are mixed to prepare a slurry. The thus-prepared slurry is coated and dried on the cathode current collector 11 to form a cathode active material layer. A pressure is applied to the stack if needed to prepare a cathode 10. The applying of the pressure may be performed by using a roll press, a flat press, or a hydrostatic press, but embodiments are not limited thereto, and any method of applying pressure that is available in the art may be used. The applying of the pressure may be omitted. The mixture of the materials constituting the cathode active material layer 12 is densification-molded in the form of a pellet or extension-molded in the form of sheet to prepare a cathode 10. When the cathode 10 is prepared in this manner, the cathode current collector 11 may be omitted.

A hybrid electrolyte composition including a monomer represented by Formula 20 and an ionic liquid is provided to the cathode.

The hybrid electrolyte composition may further include a lithium salt.

Subsequently, heat or light is applied to the provided hybrid electrolyte composition to perform a polymerization reaction.

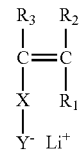

Formula 20

In Formula 20, X is an unsubstituted or substituted C6-C30 arylene group, an unsubstituted or substituted C2-C30 heteroarylene group, or —C(=O)O—R₇—, R₇ is an unsubstituted or substituted C1-C30 alkylene group or an unsubstituted or substituted C6-C30 arylene group, R₁ to R₃ are each independently a hydrogen, an unsubstituted or substituted C1-C20 alkyl group, an unsubstituted or substituted C6-C20 aryl group, or an unsubstituted or substituted C2-C30 heteroaryl group, and —Y⁻ is an anionic moiety.

In some embodiments, the polymerization reaction is performed by heat-treatment. The heat-treatment varies depending on a type of the monomer of Formula 20 and is performed, for example, at a temperature in a range of about 40° C. to about 90° C.

Examples of the monomer of Formula 20 may include monomers represented by Formulae 22 to 27.

Formula 22

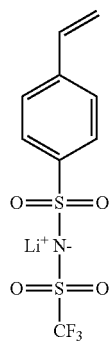

Formula 23

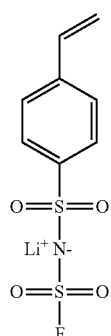

Formula 24

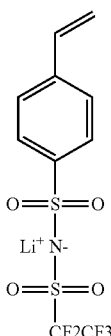

Formula 25

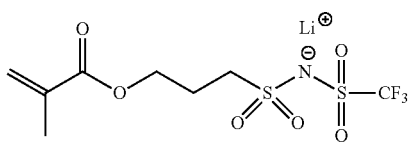

-continued

Formula 26

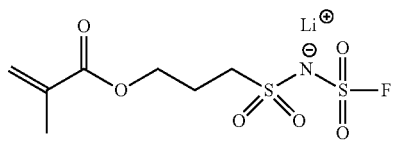

Formula 27

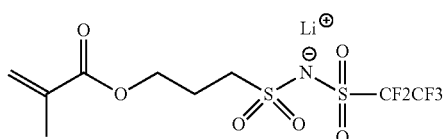

The monomer of Formula 20 may be obtained by reacting a compound of Formula 21, with a precursor of the anionic moiety, e.g., with YH, in the presence of a base and then performing a reaction to introduce lithium to the product of the reaction.

Formula 21

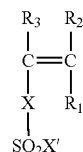

In Formula 21, X is an unsubstituted or substituted C6-C30 arylene group, an unsubstituted or substituted C2-C30 heteroarylene group, or —C(=O)O—R₇—, R₇ is an unsubstituted or substituted C1-C30 alkylene group or an unsubstituted or substituted C6-C30 arylene group, R₁ to R₃ are each independently a hydrogen, an unsubstituted or substituted C1-C20 alkyl group, an unsubstituted or substituted C6-C20 aryl group, or an unsubstituted or substituted C2-C30 heteroaryl group, and X' is a halogen atom. Examples of the halogen atom may include Cl, Br, and I.

Examples of the compound of Formula 21 may include a compound of Formula 28 or a compound of Formula 29.

Formula 28

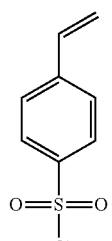

Formula 29

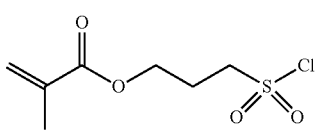

Preparation of Anode

Materials constituting the anode active material layer 22, such as an anode active material, a conducting agent, and a binder, are added to a polar solvent or a nonpolar solvent to prepare a slurry. The prepared slurry is coated and dried on the anode current collector 21 to form a stack. An anode 20 is prepared by pressuring the dried stack. The pressuring may be performed by using a roll press or a flat press, but embodiments are not limited thereto, and any press available in the art may be used. The pressuring may be performed at, for example, room temperature to about 90° C. or lower or at a temperature in a range of about 20° C. to about 90° C. In some embodiments, the pressuring may be performed at a high temperature of about 100° C. or higher. The pressuring may be omitted. The mixture of the materials constituting the anode active material layer 22 is densification-molded in the form of a pellet or extension-molded in the form of sheet to prepare an anode 20. When the anode 20 is prepared in this manner, the anode current collector 21 may be omitted.

Preparation of Solid Electrolyte

The solid electrolyte 30 is prepared by using a solid electrolyte formed of, for example, an oxide-based solid electrolyte material.

The solid electrolyte may be deposited by using a common layer deposition method such as an aerosol deposition method, a cold spray method, or a sputtering method to prepare the solid electrolyte 30. In some embodiments, the solid electrolyte 30 may be prepared by applying pressure to a mass of solid electrolyte particles. In some embodiments, the solid electrolyte 30 may be prepared by mixing a solid electrolyte, a solvent, and a binder and performing coating, drying, and pressuring processes.

Preparation of Solid Secondary Battery

The cathode 10, anode 20, and solid electrolyte 30 prepared as described above were stacked and had pressure applied so that the solid electrolyte 30 is between the cathode 10 and the anode 20, thereby preparing the solid secondary battery 1. The applying of pressure may be omitted. For example, the solid electrolyte 20 is disposed on the cathode to prepare a stack. Subsequently, the anode 20 is disposed on the stack such that the solid electrolyte 30 and the anode active material layer are adjacent, and the stack is pressed to prepare a solid secondary battery 1. The applying of pressure may be performed using a roll press, a flat press, or a hydrostatic press, but embodiments are not limited thereto, and any method of applying pressure available in the art may be used. The applying of pressure may be performed at, for example, room temperature to about 90° C. or lower or at a temperature in a range of about 20° C. to about 90° C. In some embodiments, the applying of pressure may be performed at a high temperature of about 100° C. or higher. Due to the applying of pressure, for example, a solid electrolyte powder is sintered, and thus one solid electrolyte is formed.

A composition and a preparation method of the solid secondary battery 1 are examples of various embodiments, where elements of the composition and process of the preparation may be appropriately modified.

Hereinafter, a method of preparing the cathode according to an embodiment will be described in detail.

According to an embodiment, a composite cathode active material, a conducting agent, and a binder are mixed in a solid state to prepare a cathode.

The binder may be the same as that used in the solid electrolyte as described above. As the binder, the same binder that is commonly used in a lithium battery may be added. Examples of the binder may include a thermoplastic polymer or a thermosetting resin. For example, polyethylene, polypropylene, polytetrafluoroethylene (PTFE), polyvinylidene fluoride (PVDF), a styrene-butadiene rubber, a tetrafluoroethylene-perfluoroalkylvinylether co-polymer, a vinylidene fluoride-hexafluoropropylene co-polymer, a vinylidene fluoride-chlorotrifluoroethylene co-polymer, an ethylene-tetrafluoroethylene co-polymer, polychlorotrifluoroethylene, a vinylidene fluoride-pentafluoropropylene co-polymer, a propylene-tetrafluoroethylene co-polymer, an ethylene-chlorotrifluoroethylene co-polymer, a vinylidene fluoride-hexafluoropropylene-tetrafluoroethylene co-polymer, a vinylidene fluoride-perfluoromethylvinylether-tetrafluoroethylene co-polymer, an ethylene-acrylic acid copolymer may be used alone or in combination.

In some embodiments, a solvent may be added to the composite cathode active material, conducting agent, and binder in the preparation of the cathode to obtain a cathode active material composition, and the cathode active material composition may be coated and dried on a cathode current collector to prepare a cathode. In some embodiments, the cathode active material composition may be cast onto a separate support to form a cathode active material layer, e.g., a film, which may then be separated from the support and laminated on a metallic current collector to prepare a cathode.

Examples of performing the lamination may include a solvent casting method.

Referring to FIG. 5, a solid secondary battery 1 according to an embodiment will be described.

The solid secondary battery 1 may include a cathode 10, an anode 20, and a solid electrolyte 30 between the cathode 10 and the anode 20.

After the solid electrolyte 30 is disposed between the cathode 10 and the anode 20, applying pressure to the resultant stack may be performed to prepare the solid secondary battery 1. The applying of pressure may be omitted.

When used, the applying of pressure may be performed by using, for example, a roll press, a flat press, or a hydrostatic press, but embodiments are not limited thereto, and any method of applying pressure that is available in the art may be used. The applying of pressure may be performed at, for example, in a range of about 20° C. to about 90° C. In some embodiments, the applying of pressure may be performed at a high temperature of about 100° C. or higher. For example, due to the applying of pressure, the solid electrolyte powder is sintered, and thus one solid electrolyte may be formed.

A composition and a preparation method of the solid secondary battery 1 are examples of various embodiments, where elements of the composition and process of the preparation may be appropriately modified.

Definitions of substituents used in the formulae of the present specification are as follows.

The term "alkyl" refers to a fully saturated branched or unbranched (straight chain or linear) hydrocarbon group. Examples of the alkyl group are a methyl group, an ethyl group, an n-propyl group, an isopropyl group, an n-butyl group, an isobutyl group, a sec-butyl group, an n-pentyl group, an isopentyl group, a neopentyl group, an iso-amyl group, an n-hexyl group, a 3-methylhexyl group, a 2,2-dimethylpentyl group, a 2,3-dimethylpentyl group, and an n-heptyl group.

The term "substituted" refers to a group, such as an alkyl group, where at least one hydrogen is replaced with a halogen atom, a C1-C30 alkyl group substituted with a halogen atom (e.g., $CF_3$, $CH_3CF_2$, $CH_2F$, or $CCl_3$), a C1-C30 alkoxy group, a C2-C30 alkoxyalkyl group, a hydroxyl group, a nitro group, a cyano group, an amino group, an alkylamino group, an amidino group, a hydrazine, a hydrazone, a carboxyl group or a salt thereof, a sulfonyl group, a sulfamoyl group, a sulfonic acid group or a salt thereof, a phosphoric acid or a salt thereof, a C1-C30 alkyl group, a C2-C30 alkenyl group, a C2-C30 alkynyl group, a C1-C30 heteroalkyl group, a C6-C30 aryl group, a C7-C30 arylalkyl group, a C2-C30 heteroaryl group, a C3-C30 heteroarylalkyl group, a C2-C30 heteroaryloxy group, or a C2-C30 heteroaryloxyalkyl group. The total number of carbon atoms listed in a group does not include any substituents, e.g., a —CH$_2$CN group is a C1 alkyl group substituted with a nitrile.

The term "alkenyl" refers to an aliphatic hydrocarbon having at least one carbon-carbon double bond, and the term "alkynyl" refers to an aliphatic hydrocarbon having at least one carbon-carbon triple bond.

The term "cycloalkyl" refers to an aliphatic hydrocarbon having at least one carbocyclic ring. Here, the alkyl is the same as defined above. The term "heterocycloalkyl" refers to a cyclic alkyl group including at least one heteroatom selected from N, O, P, and S. Here, the cycloalkyl group is the same as defined above.

Examples of the halogen atom include fluorine, bromine, chlorine, and iodine.

The term "alkoxy" refers to "alkyl-O—", where the alkyl is the same as defined above. Examples of the alkoxy group may include a methoxy group, an ethoxy group, a propoxy group, a 2-propoxy group, a butoxy group, a tert-butoxy group, a pentyloxy group, a hexyloxy group, a cyclopropoxy group, and a cyclohexyloxy group. At least one hydrogen atom in the alkoxy group may be substituted with the same substituent in the case of the alkyl group described above.

The term "cycloalkyloxy" refers to "cycloalkyl-O—", where the cycloalkyl is the same as defined above. The term "heterocycloalkyloxy" refers to "heterocycloalkyl-O—", where the heterocycloalkyl is the same as defined above.

The term "aryl" group may be used alone or as a combination and refers to an aromatic hydrocarbon including at least one ring. The aryl group includes a group in which an aromatic ring is optionally fused to at least one cycloalkyl ring. Examples of the aryl group may include a phenyl group, a naphthyl group, and a tetrahydronaphthyl group. Also, at least one hydrogen atom in the aryl may be substituted with the same substituent in the case of the alkyl.

The term "arylalkyl" refers to an alkyl group substituted with an aryl group, where the alkyl and the aryl are the same as defined above. An example of an arylalkyl group is a benzyl group.

The term "aryloxy" refers to "aryl-O—", where the aryl is the same as defined above.

The term "arylthio" refers to "aryl-S—", where the aryl is the same as defined above.

The term "heteroaryl" group refers to a monocyclic or bicyclic organic compound that contains at least one heteroatom (e.g., N, O, P, S, or Si) where the remaining ring atoms are carbon atoms. The heteroaryl group may include, for example, 1 to 5 heteroatoms, and 5 to 10 ring members. S or N may be oxidized to various oxidation states.

Examples of the monocyclic heteroaryl group may include a thienyl group, a furyl group, a pyrrolyl group, an imidazolyl group, a pyrazolyl group, a thiazolyl group, an isothiazolyl group, a 1,2,3-oxadiazolyl group, a 1,2,4-oxadiazolyl group, a 1,2,5-oxadiazolyl group, a 1,3,4-oxadiazolyl group, a 1,2,3-thiadiazolyl group, a 1,2,4-thiadiazolyl group, a 1,2,5-thiadiazolyl group, a 1,3,4-thiadiazolyl group, an isothiazol-3-yl group, an isothiazol-4-yl group, an isothiazol-5-yl group, an oxazol-2-yl group, an oxazol-4-yl group, an oxazol-5-yl group, an isooxazol-3-yl group, an isooxazol-4-yl group, an isooxazol-5-yl group, a 1,2,4-triazol-3-yl group, a 1,2,4-triazol-5-yl group, a 1,2,3-triazol-4-yl group, a 1,2,3-triazol-5-yl group, a tetrazolyl group, a pyrid-2-yl group, a pyrid-3-yl group, a 2-pyrazin-2yl group, a pyrazin-4-yl group, a pyrazin-5-yl group, a 2-pyrimidin-2-yl group, a 4-pyrimidin-2-yl group, and a 5-pyrimidin-2-yl group.

As used herein, the term "heteroaryl" refers to a group in which a heteroaromatic ring is optionally fused to at least one aryl, cycloaliphatic, or heterocyclic ring.

Examples of the bicyclic heteroaryl group may include an indolyl group, an isoindolyl group, an indazolyl group, an indolizinyl group, a purinyl group, a quinolizinyl group, a quinolinyl group, and an isoquinolinyl group. At least one hydrogen atom of the heteroaryl group may be substituted with the same substituent in the case of the alkyl group described above.

The term "heteroarylalkyl" refers to an alkyl group substituted with a heteroaryl group where the alkyl group and the heteroaryl group are the same as defined above.

The term "heteroaryloxy" refers to "heteroaryl-O—", where the heteroaryl is the same as defined above. Also, the term "heteroarylthio" refers to "heteroaryl-S-", where the heteroaryl is the same as defined above.

The term "alkylene", "arylene", "heteroarylene", "cycloalkylene", and "heterocycloalkylene" refer to the alkyl group, the aryl group, the heteroaryl group, the cycloalkyl group, and the heterocycloalkyl group, each respectively, in which one hydrogen atom is substituted with a radical.

Hereinafter, one or more embodiments will be described in detail with reference to the following examples and comparative examples. These examples are not intended to limit the purpose and scope of the one or more embodiments.

EXAMPLES

Preparation Example 1

Reaction Scheme 1

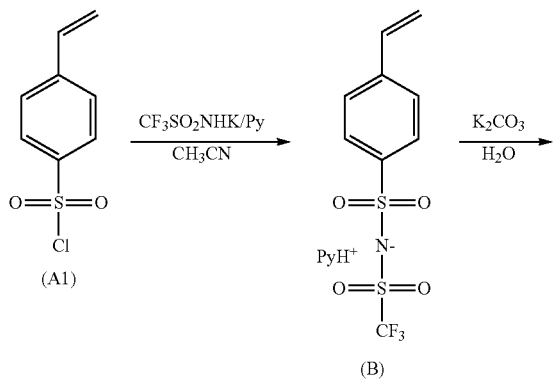

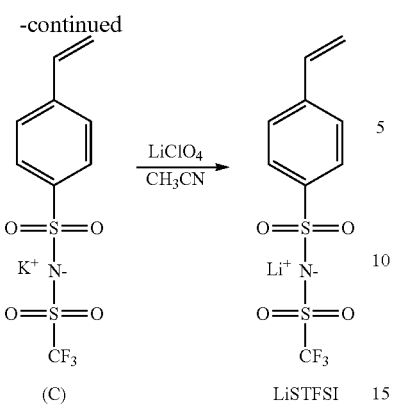

45 mmol of 4-vinylbenzenesulfonyl chloride (A1) and 40 mmol of $CF_3SO_2NHK$ were maintained in $CH_3CN$ at 0° C. and were reacted. Subsequently, 45 mmol of pyridine was added to the reaction mixture, and the resultant was stirred at 65° C. for 48 hours. Once the reaction was complete, a compound (B) was obtained.

The obtained compound (B) was purified, and 28 mmol of $K_2CO_3$ was added thereto and stirred for 5 hours. Then, a solid obtained after removing a solvent from the resultant was purified with acetone to obtain 10.5 g of a compound C (KSTFSI).

$CH_3CN$ and $LiClO_4$ were added to the compound C (KSTFSI) under an anhydrous condition to substitute K with an Li ion, and thus 7.8 g of LiSTFSI was obtained.

Preparation Example 2

Reaction Scheme 2

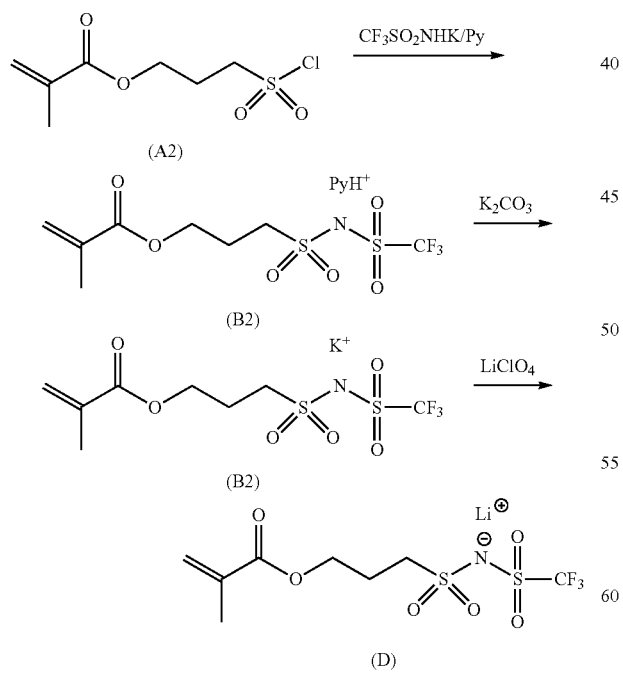

In a reactor, 45 mmol of methacryloxypropyl sulfonyl chloride (A2) and 40 mmol of $CF_3SO_2NHK$ were maintained in $CH_3CN$ at 0° C. and were reacted. Subsequently, 45 mmol of pyridine was added to the reaction mixture, and the resultant was stirred at 65° C. for 48 hours. Once the reaction was complete, a compound (B2) was obtained.

The thus-obtained compound (B2) was purified, and 28 mmol of $K_2CO_3$ was added thereto and stirred for 5 hours. Then, a solid obtained after removing a solvent from the resultant was purified with acetone to obtain 10.5 g of a compound C2 (KMAPTFSI).

$CH_3CN$ and $LiClO_4$ were added to the compound C2 (KMAPTFSI) under an anhydrous condition to substitute K with an Li ion, and thus 72 g of a compound (D) LiMAPTFSI was obtained.

Preparation of Hybrid Electrolyte Composition

Example 1

N-methyl-N-propylpyrrolidinium bis(trifluoromethanesulfonyl) imide (PYR13TFSI) as an ionic liquid and lithium bis(trifluoromethanesulfonyl)imide (LiTFSI) as a lithium salt were mixed to prepare a mixture, then LiSTFSI prepared in Preparation Example 1, was added to the mixture, and the resultant was stirred at room temperature (25° C.) to obtain a hybrid electrolyte composition. The mixing weight ratio of the ionic liquid, PYR13TFSI, to the lithium salt, LiTFSI, was 10:100. After polymerization as described below, a polymer of Formula 6 was obtained.

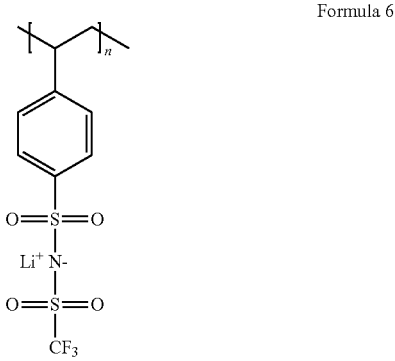

In Formula 6, n is about 200.

Example 2

A hybrid electrolyte composition was obtained in the same manner as in Example 1, except that a mixing weight ratio of PYR13TFSI to the lithium salt was 20:100 in the preparation of the hybrid electrolyte composition.

Example 3

A hybrid electrolyte composition was obtained in the same manner as in Example 1, except that the compound (D) obtained in Preparation Example 2 was used instead of LiSTFSI in the preparation of the hybrid electrolyte composition. After polymerization as described below, a polymer of Formula 7 was obtained.

Formula 7

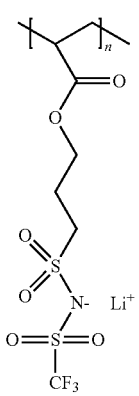

In Formula 7, n is 200.

Example 4

A hybrid electrolyte composition was obtained in the same manner as in Example 3, except that a mixing weight ratio of PYR13TFSI to the lithium salt was 20:100 in the preparation of the hybrid electrolyte composition.

Comparative Example 1

N-methyl-N-propylpyrrolidinium bis(trifluoromethanesulfonyl) imide (PYR13TFSI) was used, as an ionic liquid.

Comparative Example 2

An electrolyte composition was obtained in the same manner as in Example 1, except that 1-butyl-3-methylimidazolium tetrafluoroborate (imidazoliumBF4) was used instead of PYR13TFSI, as an ionic liquid.

Comparative Example 3

An electrolyte composition was obtained in the same manner as in Comparative Example 2, except that imidazoliumBF 4 as an ionic liquid, was not used.

Preparation of Cathode and Solid Secondary Battery

Example 5

First, a cathode was prepared as follows: LiCoO$_2$ (LCO), a conducting agent (Super-P; Timcal Ltd.), polyvinylidene fluoride (PVdF), and N-methylpyrrolidone were mixed to obtain a composition for a cathode active material layer. A mixing weight ratio of the LCO, the conducting agent, and PVdF in the composition for a cathode active material layer was 97:1.5:1.5, and an amount of N-methylpyrrolidone was about 137 g when LCO was 97 g.

The composition for a cathode active material layer was coated on an aluminum foil (thickness: about 15 μm) and dried at 25° C., and the dried resultant was dried in vacuum at about 110° C. to prepare a cathode.

A lithium metal anode (thickness: about 20 μm) was disposed on a current collector (a copper foil), and the lithium metal anode and a solid electrolyte were attached by applying a pressure of about 250 M Pa according to a cold isostatic pressing (CIP) method. A Li$_{6.5}$La$_3$Zr$_{1.5}$Ta$_{0.5}$O$_{12}$ (LLZO) layer was used as an oxide-based solid electrolyte.

The cathode was impregnated with the hybrid electrolyte composition of Example 1 and was attached on to the oxide-based solid electrolyte, i.e., LLZO layer, and the resultant stack was heat-treated at 60° C. to prepare a solid secondary battery including a cathode/oxide-based solid electrolyte/lithium metal.

The cathode contained the hybrid electrolyte including a compound of Formula 6, an ionic liquid, and a lithium salt on a surface of the cathode and in pores of the cathode.

Formula 6

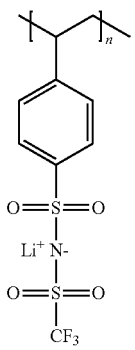

In Formula 6, n is about 200.

A lithium metal is disposed such that it contacts a lower part of the LLZO layer.

Example 6

A solid secondary battery was prepared in the same manner as in Example 5, except that the hybrid electrolyte composition of Example 2 was used instead of the hybrid electrolyte composition of Example 1.

Example 7

A solid secondary battery was prepared in the same manner as in Example 5, except that the hybrid electrolyte composition of Example 3 was used instead of the hybrid electrolyte composition of Example 1. The cathode contained the hybrid electrolyte including a compound of Formula 6, an ionic liquid, and a lithium salt on a surface of the cathode and in pores of the cathode.

Formula 7

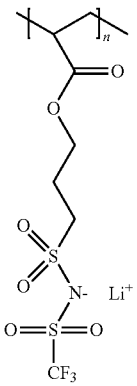

In Formula 7, n is 200.

Example 8

A solid secondary battery was prepared in the same manner as in Example 5, except that the hybrid electrolyte composition of Example 4 was used instead of the hybrid electrolyte composition of Example 1.

Comparative Examples 4 to 6

Solid secondary batteries were prepared in the same manner as in Example 5, except that the hybrid electrolyte compositions of Comparative Examples 1 to 3 were each respectively used instead of the hybrid electrolyte composition of Example 1.

The solid secondary battery of Comparative Example 6 used the hybrid electrolyte composition of Comparative Example 3, not including an ionic liquid, and thus operation of the solid secondary battery of Comparative Example 6 itself was impossible.

Evaluation Example 1: Viscosity

Viscosities of the hybrid electrolytes of Examples 1 to 3 and the ionic liquid of Comparative Example 1 were measured by using a viscometer (Brookfield]DV-II+PRO Viscometer) at 25° C., and the results are shown in Table 1.

TABLE 1

| Sample | Viscosity [cps] |
|---|---|
| Comparative Example 1 | 573 |
| Example 1 | 380 |
| Example 2 | 434 |
| Example 3 | 420 |

As shown in Table 1, the viscosities of the hybrid electrolytes of Examples 1 to 3 decreased compared to that of Comparative Example 1. As the hybrid electrolytes of Examples 1 to 3 had the viscosities shown in Table 1, the wettability with respect to a cathode was excellent.

In contrast, the ionic liquid of Comparative Example 1 exhibited an increased viscosity compared to those of the hybrid electrolytes of Examples 1 to 3, and due to the viscosity characteristic, the wettability with respect to a cathode was poor.

Evaluation Example 2: Electrochemical Stability

The hybrid electrolyte composition of Example 1 was coated on a substrate, and the resultant was heat-treated at 60° C. for 2 hours to obtain a hybrid electrolyte.

Figure 2:
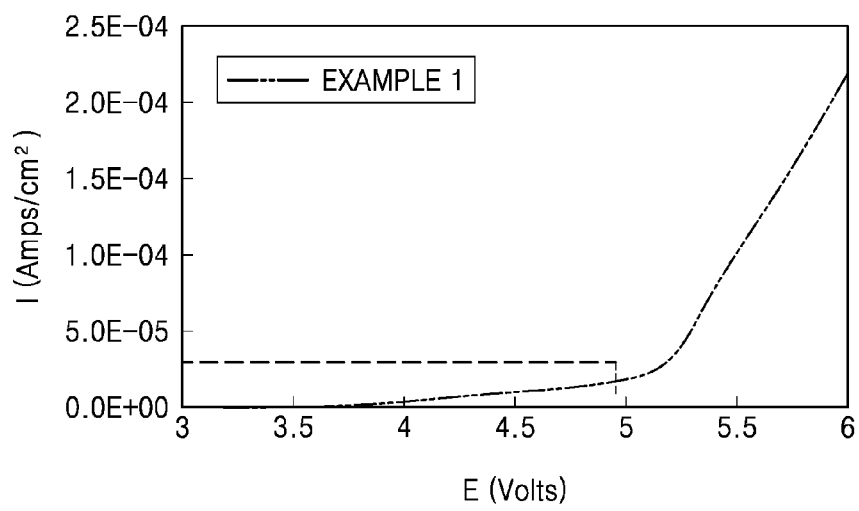
FIG. 2 shows the result of a linear sweep voltammetry (LSV) analysis performed on a hybrid electrolyte of Example 1.

The hybrid electrolyte was disposed between Li/Stainless steel (SUS) electrodes to prepare a cell. A linear sweep voltammetry (LSV) was performed on the cell at 60° C. to evaluate an electrochemical voltage window to evaluate electrochemical stability of the cell. The results of the LSV evaluation are shown in FIG. 2. A scanning rate was about 10 millivolts per second (mV/s), and a scanning voltage range was about 3.2 V to about 5 V (vs. Li/Li+). The results of the measurement are shown in FIG. 2.

As shown in FIG. 2, an oxidation reaction does not occur until 5 V, and thus the cell is electrochemically stable.

Evaluation Example 3: Resistance

An impedance analyzer (Solartron 1260A Impedance/Gain-Phase Analyzer) was used to measure resistances of the solid secondary batteries prepared in Examples 5 to 7 and Comparative Examples 4 and 5 at 25° C. according to the 2-probe method. An amplitude was ±10 mV, and a frequency range was about 0.1 Hz to about 1 MHz.

The results of the resistance measurement are as shown in Table 2.

TABLE 2

| Sample | Resistance (Ω) |
|---|---|
| Example 5 | 21 |
| Example 6 | 59 |
| Example 7 | 70 |
| Comparative Example 4 | 436 |
| Comparative Example 5 | 89 |

As shown in Table 2, the interfacial resistances of the solid secondary batteries of Examples 5 to 7 significantly decreased compared to those of the solid secondary batteries of Comparative Examples 4 and 5.

Evaluation Example 4: Lithium Ion Mobility

Lithium ion mobilities ($t_{Li+}$) of the hybrid electrolytes of Examples 1 to 3 and the ionic liquid of Comparative Example 1 were evaluated as follows.

The lithium ion mobilities may be calculated as defined in Equation 2.

As for values required for calculating the lithium ion mobility, impedance for a lithium symmetric cell or a SUS symmetric cell and a current decay decreasing by time with respect to an applied voltage were measured and used (Electrochimica Acta 93 (2013) 254).

$$t_{Li^+} = \frac{i_{SS}(\Delta V - i_0 R^0)}{i_0(\Delta V - i_{SS} R^{SS})} \qquad \text{Equation 2}$$

In Equation 2, $i_o$ is an initial current, $i_{ss}$ is a steady state current, $R^0$ is an initial resistance, and $R_{ss}$ is a steady state resistance.

The results of the lithium ion mobility evaluation are shown in Table 3.

TABLE 3

| Sample | Lithium ion mobility |
|---|---|
| Example 1 | 0.52 |
| Example 3 | 0.54 |
| Comparative Example 1 | Lower than 0.20 |

Referring to Table 3, it may be seen that lithium ion mobilities of the hybrid electrolytes of Examples 1 and 3 increased compared to that of the ionic liquid of Comparative Example 1.

Evaluation Example 5: Charging/Discharging Cycle Characteristics According to Charging/Discharging Conditions Charging/discharging characteristics of the solid secondary batteries prepared in Examples 5 and 6 and Comparative Examples 4 and 5 were evaluated by the following charging/discharging test.

The charging/discharging test was performed by placing the solid secondary batteries in a constant-temperature chamber of 60° C.

In the first cycle, the batteries were charged with a constant current of 0.3 milliamps per square centimeter ($mA/cm^2$) for 12.5 hours until the battery voltage was 4.3 volts (V). Subsequently, the batteries were discharged with a constant current of 3.2 $mA/cm^2$ for 12.5 hours until the battery voltage was 3.0 V.

In the second cycle, the batteries were charged and discharged under the same conditions of the first cycle. These cycles were repeated 50 times under the same conditions.

Figure 3:
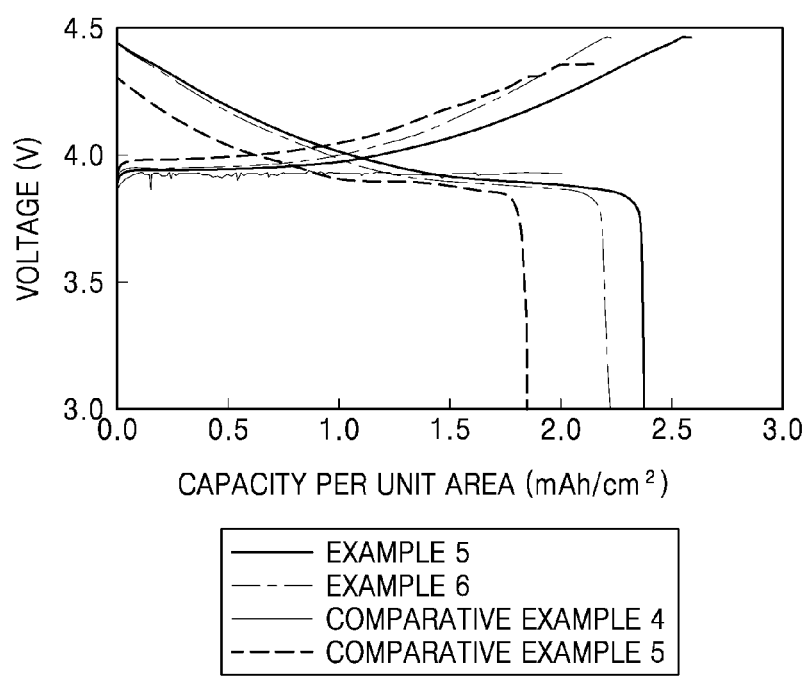
FIG. 3 shows a voltage change according to a capacity per unit area of each of solid secondary batteries according to Examples 5 and 6 and Comparative Examples 4 and 5.
Figure 4:
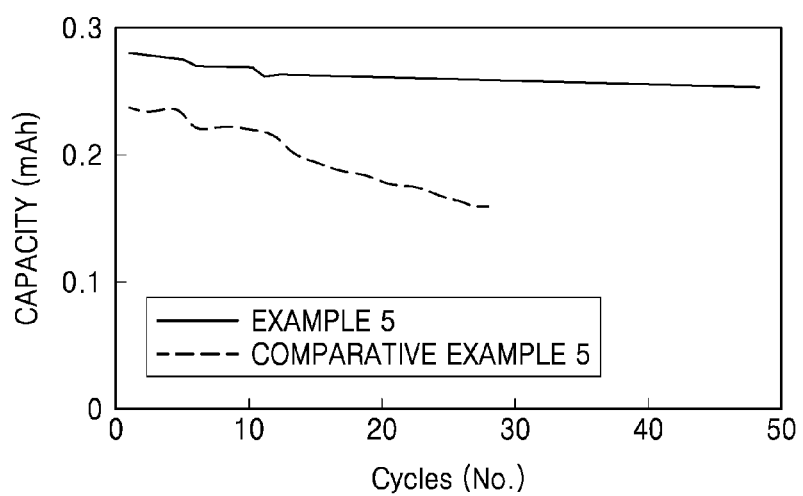
FIG. 4 shows a capacity change according to a number of cycles regarding solid secondary batteries prepared in Example 5 and Comparative Example 5.

Changes in voltage according to a discharge capacity per unit area of the solid secondary batteries are shown in FIG. 3, and changes in discharge capacity according to the number of cycles are evaluated and shown in FIG. 4. Also, after the 50 cycles, contamination of the ionic liquid was examined.

Each sample underwent the cycles, and the pouch type cells were disassembled. A lithium cobalt oxide (LCO) face of the solid electrolyte cathode was examined, and the lithium anode face (a Li metal on the copper foil) of the same solid electrolyte was examined. Particularly, in the case of the cell before applying solidification (Comparative Example 5), it was observed that the ionic liquid penetrated into the copper foil of the lithium anode face. Whereas, in the case of Example 5, leakage of the ionic liquid of the electrolyte-solidification applied cell was not confirmed.

Referring to FIG. 3, the solid secondary batteries of Example 5 and 6 operated normally, and the cycle characteristics of the solid secondary batteries of Example 5 and 6 improved compared to those of the solid secondary batteries of Comparative Examples 4 and 5.

Referring to FIG. 4, the solid secondary battery of Example 5 had improved life characteristics compared to those of Comparative Example 5.

Also, the ionic liquid of the solid secondary battery of Comparative Example 5 leaked and thus the solid secondary battery was contaminated. In contrast, it is believed that the ionic liquid was not contaminated in the lithium secondary battery of Example 5 because there was almost no leakage of the ionic liquid.

As described above, a cathode hybrid electrolyte for a solid secondary battery according to an aspect of one or more embodiments is a solidified structure, of which contamination of a current collector and leakage to the outside of a current collector are prevented, and the wettability of the electrolyte to a cathode improves. Thus, interfacial performance between the cathode and the solid electrolyte improves. Also, the cathode hybrid electrolyte has improved lithium ion mobility. When the cathode hybrid electrolyte of the current invention is used, a solid secondary battery having improved cycle characteristics and life characteristics may be prepared.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A cathode hybrid electrolyte for a solid secondary battery, the cathode hybrid electrolyte comprising
    an ion conductor represented by Formula 1,
    an ionic liquid, and
    a lithium salt different from the ion conductor of Formula 1,

Formula 1 wherein, in Formula 1, X is an unsubstituted or substituted C6-C30 arylene group, an unsubstituted or substituted C2-C30 heteroarylene group, or —C(=O)O—$R_7$—;

$R_7$ is an unsubstituted or substituted C1-C30 alkylene group or an unsubstituted or substituted C6-C30 arylene group;

$R_1$ to $R_3$ are each independently hydrogen, an unsubstituted or substituted C1-C20 alkyl group, an unsubstituted or substituted C6-C20 aryl group, or an unsubstituted or substituted C2-C30 heteroaryl group;

—$Y^-$ is an anionic moiety, wherein an anion of the ionic liquid comprises the same anionic moiety —$Y^-$ as in Formula 1;

n is a degree of polymerization, which is a number in a range of 10 to 500, and wherein the ion conductor represented by Formula 1 is a homopolymer.

2. The cathode hybrid electrolyte of claim 1, wherein —$Y^-Li^+$ in Formula 1 is a group represented by Formula 2 or Formula 3,

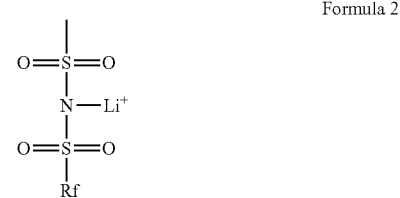

Formula 2 wherein, in Formula 2, Rf is a fluorine atom, an unsubstituted or substituted C1-C30 fluorinated alkyl group, an unsubstituted or substituted C6-C30 arylene group, or a combination thereof,

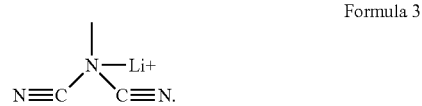

Formula 3

3. The cathode hybrid electrolyte of claim 1, wherein the ion conductor represented by Formula 1 is a compound represented by Formula 4 or a compound represented by Formula 5, Formula 4

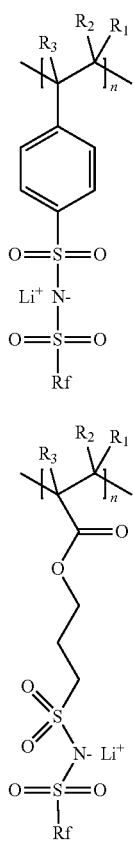

Formula 5

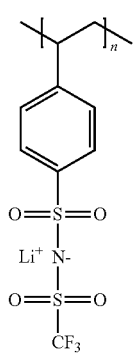

wherein, in Formulae 4 and 5, n is a number in a range of 10 to 500, $R_1$ to $R_3$ are each independently hydrogen or a C1-C20 alkyl group, and Rf is a fluorine atom, an unsubstituted or substituted C1-C30 fluorinated alkyl group, an unsubstituted or substituted C6-C30 arylene group, or a combination thereof.

4. The cathode hybrid electrolyte of claim 1, wherein the ion conductor represented by Formula 1 is a compound represented by Formula 6, Formula 6-1, Formula 6-2, Formula 7, Formula 7-1, or Formula 7-2, or a combination thereof, Formula 6

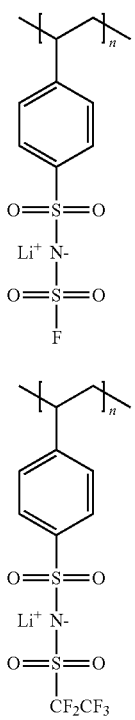

Formula 6-1

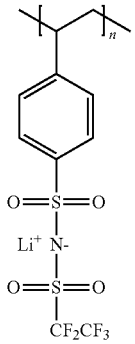

Formula 6-2

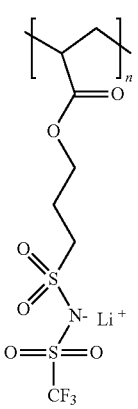

wherein, in Formulae 6, 6-1, and 6-2, n is a number in a range of 10 to 500,

Formula 7

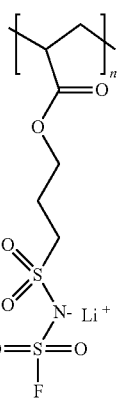

Formula 7-1

Formula 7-2

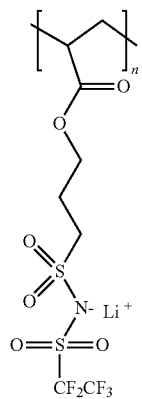

and, in Formulae 7, 7-1, and 7-2, n is a number in a range of 10 to 500.

5. The cathode hybrid electrolyte of claim 1, wherein an amount of the ionic liquid is in a range of about 1 part by weight to about 50 parts by weight based on 100 parts by weight of the lithium salt.

6. The cathode hybrid electrolyte of claim 1, wherein an amount of the ion conductor is in a range of about 0.1 parts by weight to about 50 parts by weight based on 100 parts by weight of the lithium salt.

7. The cathode hybrid electrolyte of claim 1, wherein the ionic liquid is a compound represented by Formula 8, a compound represented by Formula 9, or a combination thereof,

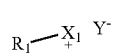

Formula 8 wherein, in Formula 8, $X_1$ is —$N(R_2)(R_3)(_R4)$ or —$P(R_2)(R_3)(R_4)$, $R_1$, $R_2$, $R_3$, and $R_4$ are each independently an unsubstituted or substituted C1-C30 alkyl group, an unsubstituted or substituted C1-C30 alkoxy group, an unsubstituted or substituted C6-C30 aryl group, an unsubstituted or substituted C6-C30 aryloxy group, an unsubstituted or substituted C2-C30 heteroaryl group, an unsubstituted or substituted C2-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group,

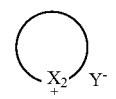

Formula 9 wherein, in Formula 9,

is a heterocycloalkyl ring or a heteroaryl ring including 1 to 3 heteroatoms and 2 to 30 carbon atoms, the rings substituted by a substituent or unsubstituted, and $X_2$ is —$N(R_5)(R_6)$, —$N(R_5)$, —$P(R_5)$, or —$P(R_5)(R_6)$;

wherein $R_5$ and $R_6$ are each independently hydrogen, an unsubstituted or substituted C1-C30 alkyl group, an unsubstituted or substituted C1-C30 alkoxy group, an unsubstituted or substituted C6-C30 aryl group, an unsubstituted or substituted C6-CY30 aryloxy group, an unsubstituted or substituted C2-C30 heteroaryl group, an unsubstituted or substituted C2-C30 heteroaryloxy group, an unsubstituted or substituted C4-C30 cycloalkyl group, an unsubstituted or substituted C3-C30 heterocycloalkyl group, or an unsubstituted or substituted C2-C100 alkylene oxide group; and $Y^-$ is an anion, wherein at least a portion of the anions $Y^-$ in Formulas 8 and 9 comprises the anionic moiety —$Y^-$ of Formula 1.

8. The cathode hybrid electrolyte of claim 1, wherein the ionic liquid is a compound represented by Formula 10, a compound represented by Formula 11, or a combination thereof,

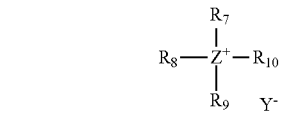

Formula 10

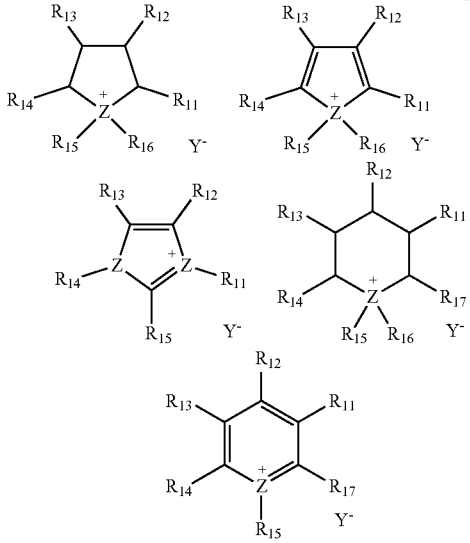

Formula 11 wherein, in Formula 10, Z is N or P; $R_7$, $R_8$, $R_9$, and $R_{10}$ are each independently an unsubstituted or substituted C1-C30 alkyl group, an unsubstituted or substituted C6-C30 aryl group, an unsubstituted or substituted C2-C30 heteroaryl group, an unsubstituted or substituted C4-C30 cycloalkyl group, or an unsubstituted or substituted C3-C30 heterocycloalkyl group, wherein, in Formula 11, Z is N or P;

$R_{11}$, $R_{12}$, $R_{13}$, $R_{14}$, $R_{15}$, $R_{16}$, and $R_{17}$ are each independently hydrogen, an unsubstituted or substituted C1-C30 alkyl group, an unsubstituted or substituted C6-C30 aryl group, an unsubstituted or substituted C2-C30 heteroaryl group, an unsubstituted or substituted C4-C30 cycloalkyl group, or an unsubstituted or substituted C3-C30 heterocycloalkyl group; and $Y^-$ is an anion represented by Formula 2-1 or Formula 3-1,

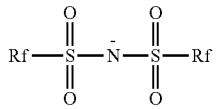

Formula 2-1 wherein, in Formula 2-1, Rf is a fluorine atom, an unsubstituted or substituted C1-C30 fluorinated alkyl group, an unsubstituted or substituted C6-C30 arylene group, or a combination thereof

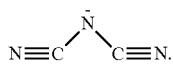

Formula 3-1

9. The cathode hybrid electrolyte of claim 1, wherein the ionic liquid is represented by one of Formulae 11a, 11b, and 12 to 15,

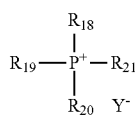

Formula 11a

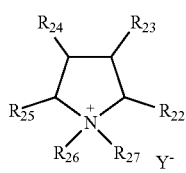

Formula 11b

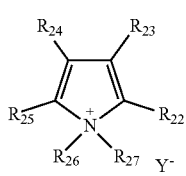

Formula 12

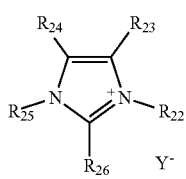

Formula 13

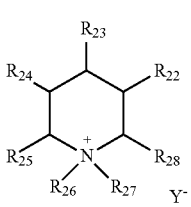

Formula 14

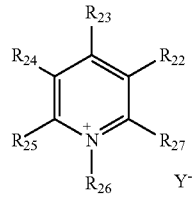

Formula 15 wherein, in Formulae 11a, 11b, and 12 to 15, $R_{18}$ to $R_{27}$ are each independently an unsubstituted or substituted C1-C30 alkyl group, an unsubstituted or substituted C6-C30 aryl group, an unsubstituted or substituted C2-C30 heteroaryl group, an unsubstituted or substituted C4-C30 cycloalkyl group, or an unsubstituted or substituted C3-C30 heterocycloalkyl group; and $Y^-$ is an anion represented by Formula 2-1 or Formula 3-1,

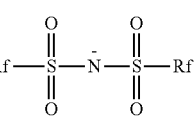

Formula 2-1 wherein, in Formula 2-1, Rf is a fluorine atom, an unsubstituted or substituted C1-C30 fluorinated alkyl group, an unsubstituted or substituted C6-C30 arylene group, or a combination thereof

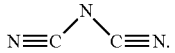

Formula 3-1

10. The cathode hybrid electrolyte of claim 1, wherein the ionic liquid is at least one of Formulae 30 to 33.

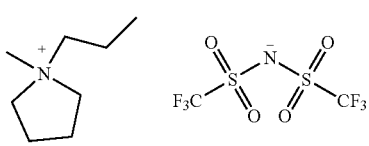

Formula 30

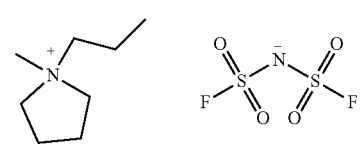

Formula 31

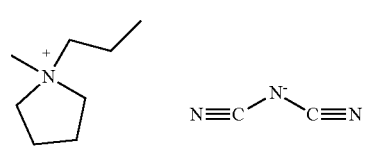

Formula 32

-continued

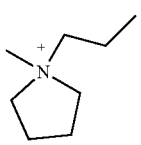 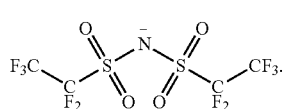

Formula 33

11. The cathode hybrid electrolyte of claim 1, wherein the lithium salt comprises at least one of LiPF$_6$, LiBF$_4$, LiCF$_3$SO$_3$, Li(CF$_3$SO$_2$)$_2$N, Li(CF$_3$SO$_2$)$_3$C, LiC$_2$F$_5$SO$_3$, Li(FSO$_2$)$_2$N, LiC$_4$F$_9$SO$_3$, LiN(SO$_2$CF$_2$CF$_3$)$_2$, LiN (CN)$_2$, or a compound represented by Formulae 16 to 19, and the concentration of the lithium salt is in a range of about 0.01 moles per liter to about 5 moles per liter, based on a total volume of the hybrid electrolyte

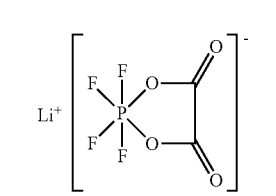

Formula 16

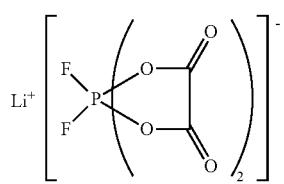

Formula 17

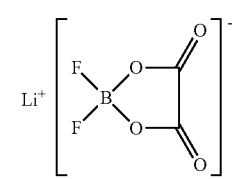

Formula 18

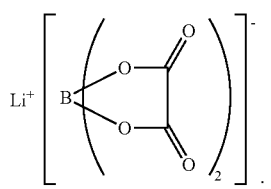

Formula 19

12. The cathode hybrid electrolyte of claim 1, wherein the cathode hybrid electrolyte has an ion conductivity of about 0.5 Siemens per centimeter or higher and a lithium ion mobility of about 0.5 or greater.

13. A cathode for a solid secondary battery, the cathode comprising:
    a cathode active material; and
    the cathode hybrid electrolyte of claim 1.

14. The cathode of claim 13, wherein
    the cathode comprises a plurality of cathode active material particles, wherein the cathode hybrid electrolyte is disposed between the plurality of cathode active material particles, or
    the cathode comprises a cathode active material layer comprising the cathode active material, wherein the cathode hybrid electrolyte is disposed in at least one of pores in the cathode active material layer or on a surface of the cathode active material layer.

15. The cathode hybrid electrolyte of claim 1, wherein a mixing weight ratio of the ionic liquid to the lithium salt is 10:100 to 20:100.

16. The cathode hybrid electrolyte of claim 1, wherein
    the ion conductor represented by Formula 1 is a compound represented by Formula 4 or a compound represented by Formula 5, and
    an anion Y— of the ionic liquid is an anion represented by Formula 2-1,

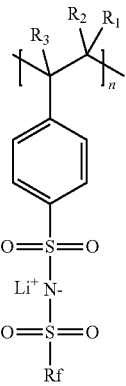

Formula 4

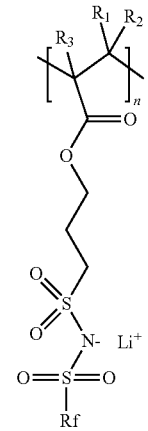

Formula 5 wherein, in Formulae 4 and 5, n is a number in a range of 10 to 500,

R$_1$ to R$_3$ are each independently hydrogen or a C1-C20 alkyl group, and

Rf is a fluorine atom, an unsubstituted or substituted C1-C30 fluorinated alkyl group, an unsubstituted or substituted C6-C30 arylene group, or a combination thereof,

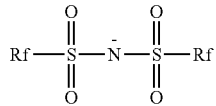

Formula 2-1 wherein, in Formula 2-1, Rf is a fluorine atom, an unsubstituted or substituted C1-C30 fluorinated alkyl group, an unsubstituted or substituted C6-C30 arylene group, or a combination thereof.

17. A solid secondary battery comprising:
a cathode;
an anode; and
a solid electrolyte disposed between the cathode and the anode,
wherein at least one of the cathode or the anode comprises the cathode hybrid electrolyte of claim 1.

18. The solid secondary battery of claim 17, wherein the solid electrolyte is an oxide-containing solid electrolyte.

19. The solid secondary battery of claim 18, wherein the oxide-containing solid electrolyte is at least one of $Li_{1+x+y}Al_xTi_{2-x}Si_yP_{3-y}O_{12}$ where $0<x<2$ and $0\leq y<3$, $BaTiO_3$, $Pb(Zr,Ti)O_3$ (PZT), $Pb_{1-x}La_xZr_{1-y}Ti_yO_3$ (PLZT) where $0\leq x<1$ and $0\leq y<1$, $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, $SiC$, lithium phosphate ($Li_3PO_4$), $Li_xTi_y(PO_4)_3$ where $0<x<2$ and $0<y<3$, $Li_xAl_yTi_z(PO_4)_3$ where $0<x<2$, $0<y<1$, and $0<z<3$, $Li_{1+x+y}(Al_aGa_{1-a})_x(Ti_bGe_{1-b})_{2-x}Si_yP_{3-y}O_{12}$ where $0\leq x\leq 1$ $0\leq y\leq 1$, $0\leq a\leq 1$, and $0\leq b\leq 1$, $Li_xLa_yTiO_3$ where $0<x<2$ and $0<y<3$, $Li_xGe_yP_zS_w$) where $0<x<4$, $0<y<1$, $0<z<1$, and $0<w<5$, lithium nitride glass ($Li_xN_y$) where $0<x<4$ and $0<y<2$, $SiS_2(Li_xSi_yS_z)$ where $0<x<3$, $0<y<2$, and $0<z<4$, $P_2S_5$ glass ($Li_xP_yS_z$) where $0<x<3$, $0<y<3$, and $0<z<7$, $Li_2O$, LiF, LiOH, $Li_2CO_3$, $LiAlO_2$, $Li_2O$—$Al_2O_3$—$SiO_2$—$P_2O_5$—$TiO_2$—$GeO_2$-type ceramics, garnet-type ceramics, $Li_{3+x}La_3M_2O_{12}$ where M=Te, Nb, or Zr, and x is an integer of 1 to 10, or a combination thereof.

20. The solid secondary battery of claim 17,
wherein the cathode comprises a lithium nickel manganese oxide compound, a lithium cobalt oxide compound, a lithium nickel cobalt manganese oxide compound, a lithium nickel cobalt aluminum oxide compound, a lithium iron phosphate oxide compound, an over-lithiated layered oxide compound, or a combination thereof, and
wherein the anode comprises amorphous carbon, crystalline carbon, a metal, a metalloid, or a combination thereof that forms an alloy or a compound with lithium as an anode active material.

* * * * *